United States Patent [19]  
Bradley

[11] 3,775,148  
[45] Nov. 27, 1973

[54] PIGMENT COMPOSITIONS
[75] Inventor: Gordon Frank Bradley, Paisley, Scotland
[73] Assignee: Ciba-Geigy AG, Basel, Switzerland
[22] Filed: May 7, 1971
[21] Appl. No.: 141,385

[30] Foreign Application Priority Data
July 16, 1970 Great Britain ................... 34,428/70
July 16, 1970 Great Britain ................... 34,429/70

[52] U.S. Cl. ............... 106/288 Q, 116/308, 116/309
[51] Int. Cl. ............................................. G08h 17/44
[58] Field of Search ................... 106/288 Q, 308 Q, 106/308 M, 308 N, 309; 260/180–183

[56] References Cited
UNITED STATES PATENTS
2,282,006  5/1942  Sloan .............................. 106/308 N
3,577,254  5/1971  Petke .............................. 106/308 Q
3,437,503  4/1969  Massam .......................... 106/309

FOREIGN PATENTS OR APPLICATIONS
1,138,465  1/1969  Great Britain .................. 106/288 Q Primary Examiner—Delbert E. Gantz
Attorney—Wenderoth, Lind & Ponack

[57] ABSTRACT

In a process of the preparation of a diarylide pigment composition by coupling a tetrazotized pigment benzidine with a pigment coupling agent and incorporating in the pigment a watersoluble dyestuff, preferably diarylide dyestuff, the step of subjecting the obtained pigment composition to a conventional solvent treatment, of additionally incorporating in the pigment composition a fatty alcohol, diol or polyol containing from eight to 22 carbon atoms or an aliphatic amine, amine salt or amine oxide containing from one to 20 carbon atoms, and any combination thereof and the pigment composition obtained by the process.

110 Claims, No Drawings

PIGMENT COMPOSITIONS

The invention of the co-pending patent application Ser. No. 141,004 filed on May 6, 1971 relates to pigment compositions, and is particularly concerned with the preparation of diarylide pigment compositions. Diarylide pigments are also known as benzidine pigments, but the former nomenclature is preferred according to modern usage.

We have discovered how to prepare diarylide pigment compositions which have better colour strength and transparency properties than conventional diarylide pigments when incorporated in printing inks. According to the invention, we prepare diarylide pigment compositions by coupling a tetrazotised pigment benzidine with a pigment coupling agent, and we incorporate in the pigment a water-soluble dyestuff; normally this will be a coupled diarylide dyestuff, but other classes of dyestuffs, such as monoazo dyestuffs or even dyestuffs such as Diphenyl Chrysoine which are not even azo dyestuffs, can be used. In this specification, we use the terms pigment benzidine and pigment coupling agent merely to differentiate the compounds forming the pigment from the compounds which are used to form the dyestuff.

The incorporation of the dyestuff may be carried out in a number of ways; in one process, we use a stoichiometric excess of the pigment coupling agent over the tetrazotised pigment benzidine, and we add a minor proportion of one or more tetrazotised sulphonated benzidines or tetrazotised carboxylated benzidines to the tetrazotised pigment benzidine before the coupling, or to a portion of the pigment coupling agent before the coupling or to the reaction mixture during or after the coupling, preferably prior to the isolation and drying of the pigment.

In another process, we may use a stoichiometric excess of the tetrazotised pigment benzidine over the pigment coupling agent, and add a minor proportion of one or more coupling agents containing water-solubilising functional groups to the pigment coupling agent before the coupling, or to a portion of the tetrazotised pigment benzidine before the coupling or to the reaction mixture during or after the coupling.

The desired modification of the properties of diarylide pigments may also be achieved, according to the invention, by adding one or more soluble dyestuffs to the tetrazotised pigment benzidine before the coupling or to a portion of the pigment coupling agent before the coupling or to the reaction mixture during or after the coupling, or to the previously prepared diarylide pigment, or by conducting the coupling of the pigment in a solution of such a soluble dyestuff. In such cases, the coupling agent of the dyestuff need not be the same as the coupling agent in the pigment itself, nor need the respective tetrazotised benzidines be the same; indeed the dyestuff need not in fact have a similar structure to that of the pigment it is being used to modify.

As has been stated, the pigment compositions produced according to our invention give products of high tinctorial strength, high gloss and good transparency when incorporated in letterpress ink varnish media. The texture and rheological properties of the compositions are not however completely satisfactory.

The solvent treatment of pigments is known. Such treatment in general results in pigments which are tinctorially weak, opaque in print and of low gloss, but which give good flowing inks when incorporated in letterpress ink varnish media. The texture of the pigment is again poor.

Furthermore it is known to treat azo pigments with fatty acids to obtain products with good colouring strength and pure brilliant tones; the products have the advantage that they are more easily filtered from finely dispersed suspensions for use in a dry state. No mention is made of the texture of the pigment.

Pigments which have good texture and which give letterpress inks of good strength, good transparency and good rheological properties are, in fact, very difficult to obtain. We have now surprisingly found that if we combine the preparation of pigment compositions according to our invention with a conventional solvent treatment, or with the addition of long chain fatty alcohol, diol or polyol, we obtain a pigment which not only has desirable qualities in letterpress inks, but which especially has good flow properties and transparency, facts which could not have been predicted from a knowledge of the effect of any of the processes alone. According to a further feature of the invention, therefore, we subject the pigment composition to a conventional solvent treatment, or additionally incorporate in it a fatty alcohol, diol, or polyol containing at least eight and preferably eight to 22 carbon atoms, which may or may not contain ether or ester linkages.

It would be expected that two opposing mechanisms (dyestuff inhibiting crystallite growth and solvent encouraging growth) would result in a compromise product, since flow properties can normally be related to transparency — the more opaque the better the flow. However, we find that we obtain the best out of both treatments with respect to transparency and flow.

Simple solvent treatment of pigments results in compositions possessing good flow properties (at low shear rates), and these produce opaque prints in inks. For multi-colour printing processes it is important that inks lay down as a transparent film. Hence to obtain both transparency of print and a good flowing ink is very important.

One specific example of a pigment whose properties can be dramatically improved in this way is that obtained from coupling acetoacet-o-anisidide and tetrazotised 3:3'-dichlorobenzidine, a benzidine yellow pigment. Compared with the pigment prepared in conventional manner, pigment in which a water-soluble coupled diarylide dyestuff is incorporated has improved rheological properties and almost equal tinctorial strength in letterpress ink media, and pigment which has been subjected to solvent treatment in the absence of dyestuff has improved rheological properties and lower tinctorial strength and gives more opaque prints in letterpress ink media. Pigment treated in both ways has improved rheological properties, almost maintains the tinctorial strength, gloss and transparency of untreated pigment, and shows improved texture.

We found already how the surface properties of azo pigment particles may be modified in a desirable manner if certain specific alcohols are present during the preparation of the pigment, or if the pigment is treated with these alcohols after it has been prepared by conventional methods.

We prepare an azo pigment by coupling a diazotised amino compound and a coupling agent, and we add a minor proportion of a fatty alcohol or diol or polyol containing from eight to 22 and preferably at least 12 carbon atoms to the coupling agent before the coupling, or to the amino compound before or after diazotisation and before the coupling, or to the reaction mixture during the coupling, or to the pigment slurry resulting from the coupling. The pigment is then worked up in the usual way. Furthermore, we state that it is also possible to obtain the modification of surface properties by the addition of the minor proportion of these alcohols, diols or polyols to a preformed azo pigment, for example, by forming the pigment into an aqueous slurry, adding the alcohol, diol or polyol to the slutty with agitation and heating, and then filtering off and washing and drying the pigment.

If the alcohol, diol or polyol is to be added to one or other of the starting materials used in the preparation of the pigment, or is added to the reaction mixture in the course of the coupling the timing of the various stages of the coupling and their temperature need not be significantly altered. When the alcohol, diol or polyol is added to a slurry of pigment, we have found that the time necessary to achieve the desired effect, that is to say before the pigment is filtered off, washed and dried, is not too critical and can range from a few minutes up to 2 – 3 hours. The production of azo pigments normally involves a step in which a slurry of the pigment is heated or boiled before the pigment is filtered off, and it is advantageous if the alcohol, diol or polyol is present at least during the heating step. This is not essential, however, and good results can be obtained at temperatures ranging from 0° to 100° C.

The fatty alcohols to be used in the process according to the invention may be primary, secondary or tertiary alcohols, and may be saturated or unsaturated; the diols or polyols may contain primary, secondary or tertiary hydroxyl groups, and may also be saturated or unsaturated. Examples of suitable materials are cetyl alcohol, oleyl alcohol, behenyl alcohol, iso-octanol, 2-ethyl hexan 1:3 diol. The amount of alcohol, polyol or diol may suitably be from 0.1 to 30 percent by weight of the weight of the dry pigment itself being produced or being treated, with amounts of from 0.1 to 10 percent by weight being preferred. When long chain alcohols, that is $C_{16} – C_{22}$, are used, analytical results show that more than 80 percent may be retained in the final pigment compositions; the proportion retained decreases as the chain length is reduced. This is predictable from a knowledge of the solubilities of fatty alcohols in water.

When the alcohol, diol or polyol is present during the coupling, or is added to the reaction mixture during the coupling, it is advantageous if a non-ionic surface active agent such as the ethoxylated cetyl alcohol condensate sold under the trade mark Lubrol W, is also present. It is found that oil inks prepared from pigment produced in this way have better flow properties and higher gloss than inks prepared from untreated pigment. It has also proved advantageous to add a metallic salt of a resin, or the free resin itself, to pigment which has been produced or treated according to the invention; it is found that inks prepared from the pigment then have better tinctorial strength and flow properties than do inks prepared from untreated pigment. Similarly it is found that the presence of resinous substances such as hydrogenated rosins also improves the printing performance of inks. Resins or resinous materials may be present from the start or may be added after the coupling stage of the process.

It has also been found that the presence of fatty acid such as oleic acid or stearic acid in the pigment composition improves the flow and the printing properties of inks. The acids may be added, preferably as their sodium salts, during or after the coupling stage or they may be present from the start. They may be rendered insoluble in the final pigment composition by conversion to sparingly soluble salts such as the calcium and zinc salts. The presence of fatty esters is similarly of value.

It is known that to treat diarylide pigments with up to 25 percent on pigment weight of high molecular weight fatty amines gives products showing excellent dispersibility in publication gravure ink media. Such products, however, show a defect in that the high colour strength initially developed is not maintained during storage of the ink.

We have now surprisingly found that if we combine the preparation of pigment according to our invention with an amine treatment, we can prepare products having excellent dispersibility as well as having improved storage stability in ink media, a fact which could not have been predicted from a knowledge of the effect of either of the processes alone. According to a further feature of the invention, therefore, we incorporate in the pigment composition a minor proportion of an aliphatic amine, amine salt or amine oxide containing from one to 20 carbon atoms, and the products are then found to have excellent rheological properties in letter press inks.

The exact constitution of the pigment composition obtained by incorporating a water-soluble coupled diarylide dyestuff in a pigment and treating the composition with amine will depend on the dyestuff, on the ways in which the stages of the process are carried out, and on the proportion of amine or amine oxide used. This proportion will generally lie between 0.1 and 35 percent calculated on the weight of the pigment and dyestuff. Where a large amount of amine, say more than 10 percent is used, the products are stable to storage when used in gravure ink applications, whereas where up to 10 percent is used, the products show excellent transparency, strength, dispersibility and rheological properties in letterpress ink media. The amine or amine oxide may be present during the coupling or may be added to the tetrazotised pigment benzidine or to the pigment coupling agent before the coupling, as well as being added in various ways to preformed pigment.

If a large quantity of an amine is used, and especially if the dyestuff contains a reactive carbonyl group, then an azomethine dyestuff may be formed. For example, in the case of a pigment containing a sulphonated benzidine dyestuff of formula

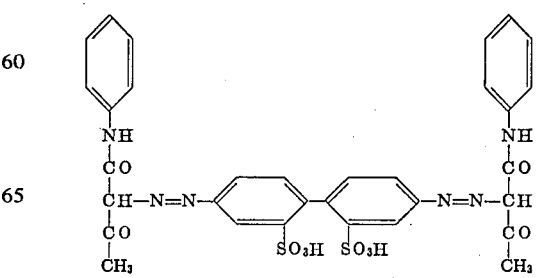

an azomethine dyestuff may be formed, which may be envisaged as having the formula (in the presence of sodium ions)

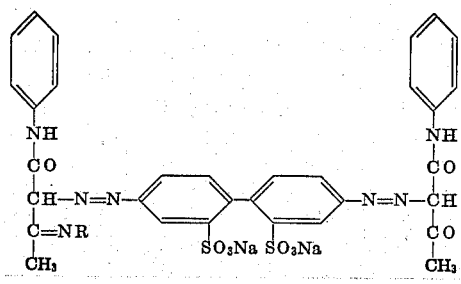

the mono-azomethine, or

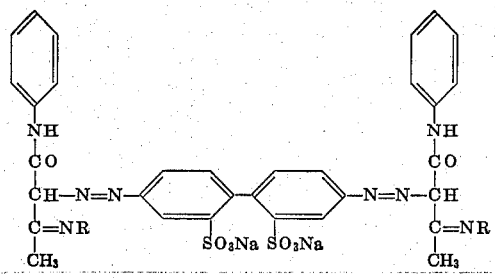

the diazomethine.

In these formulae, R is an alkyl group, containing from one to 20 carbon atoms, $RNH_2$ being the amine used in the process according to the invention. Depending on the pH, and the quantities and order of addition of the reactants, there may be dyestuff, free amine, or amine salt or any combination of these present in the pigment, or there may also be present amine salt of the dyestuff, azomethine of the dyestuff or amine salt of the azomethine of the dyestuff.

If a tetrazotised pigment benzidine is coupled with a pigment coupling agent, in the presence of dyestuff, an amine salt is added after the coupling, the pH raised to alkaline, say pH 10, and the slurry boiled, sodium or other alkali metal being the only metallic cation present, then it is found that the dyestuff in the pigment product is in the form of its metal salt, no amine salt is present and no azomethine is present.

Alternatively, the slurry may first be boiled, then the amine salt added, and the pH subsequently raised, or the amine salt added to the slurry before the slurry is boiled, and the pH raised later. In each case it can be envisaged that during the coupling, the dyestuff is adsorbing on to freshly precipitated particles and this stabilises the crystallite size of the pigment. No chemical reaction is occurring between the dyestuff and the pigment. The amine salt is added and this also partly adsorbs on to the pigment particles and the excess amine is later flocculated on to the pigment's surface as free amine. Pigment formed in this way and dispersed into gravure ink media, is found to be stable to storage and to possess better tinctorial strength than a pigment which has merely been treated with amine in conventional manner. The pigment still retains the excellent dispersibility which is a feature of amine-treated pigments.

If the procedure first desribed is slightly altered, in that the pigment is coupled first in the presence of dyestuff, the slurry is made alkaline, say pH 10 again, the amine salt added to the alkaline slurry, and the slurry then boiled, analytical examination of the pigment shows that the metal content of the pigment has fallen below the theoretical amount required for the formation of metal dyestuff salt, and that free amine and amine salt of dyestuff are present. Pigment formed in this way and dispersed into gravure ink media is found to be stable to storage and to possess better tinctorial strength than a pigment which has merely been treated with amine in conventional manner; the inks also have excellent rheological properties, due, it may be asserted, to the presence of amine salt of dyestuff.

Here again this procedure last described may be slightly modified with the same results; the slurry may be made alkaline and then boiled before the amine salt is added, or the slurry may be boiled, then made alkaline and the amine salt added. In each case the product is the same.

If the pigment is coupled in the presence of dyestuff, the slurry is kept acid, amine salt then added and the slurry boiled, amine salt itself is found to be present in the pigment product. The same result is obtained if the slurry is kept acid, boiled, and then the amine salt added.

A further way in which the process according to the invention may be carried out involves the incorporation of the dyestuff into the pigment, the formation of a metal salt of the dyestuff and then the addition of the amine. The adsorbed soluble dyestuff may be rendered insoluble by the formation of an insoluble salt of a metal of Groups IA, IB, IIA, IIB, IIIA, IIIB and VIII of the Periodic Table. One very suitable way of forming the insoluble salt is by a double decomposition reaction between the sodium salt of the dyestuff and a water-soluble salt of the selected metal at an alkaline pH such as 8 – 9; typical soluble metal salts are zinc sulphate, magnesium sulphate, barium chloride, aluminium sulphate and calcium chloride.

In these processes, the evidence suggests that an adsorbed layer of dyestuff is built up during the pigment preparation. The addition of amine salts causes further adsorption on to the pigment surface as the amine group is attracted to acid groups of the dyestuff. The combined effect of this doubly adsorbed layer is to protect the pigment particles during boiling and drying. It is believed that dyestuff treatment itself controls the size of the primary pigment particles but does not give protection against cementation (aggregation) of the primary particles during the boiling and drying stages. The resulting pigment does not easily disperse in pigment carriers, that is it has bad texture. However, with amine treatment as well the particles are better protected against cementation during the boiling and drying processes, and products are produced with better texture; the rheological properties of the products in letterpress inks are improved greatly by this combined dyestuff/amine treatment and are better than the properties of pigments which have been subjected to dyestuff treatment alone, and than the properties of conventional pigments treated with amines.

The amines to be used in the invention may be primary, secondary or tertiary amines. Examples of amines are primary amines such as the product, mainly strealyamine sold under the trademark Armeen T, resin amines such as amine derivatives of wood rosin and allied compounds sold under the trademark Rosin Amine D, N-long chain alkylalkylene diamines such as those sold under the trademark Duomeen, polyamines such as N-cocotrimethylene diamine-N'-propylamine, polyamide/polyamine derivatives such as those sold under the trademark Merginamide, β-amines such as those sold under the trademarks Armeen L11 and Duomeen L15, ethoxylated fatty amines and diamines such as those sold under the trademarks Ethomeen and Ethoduomeen, and derivatives of these compounds. Other specific amines are listed in the Examples later, for instance in Table 9.

As has been stated, processes according to the invention result in the production of pigments which may contain one or more of dyestuff, free amine, amine salt, amine salt of dyestuff and azomethine compound of dyestuff, the formation of the last two mentioned of course depending on the existence of acid groups on the dyestuff. Amine salts of water soluble coupled diarylide dyestuff are novel compounds per se. When dispersed in gravure ink media the salts give desirable colouring properties with obvious advantages in tinctorial strength because of their partial solubility in the media.

Good results are also obtained, according to the invention, if the pigment composition is both subjected to a conventional solvent treatment, and has incorporated in it a minor proportion of an aliphatic amine, amine salt or amine oxide containing from one to 20 carbon atoms.

The invention will be exemplified with five classes of diarylide pigments, as follows:

1. Benzidine Yellows:

| Name or colour index number | Formed by coupling |
|---|---|
| Pigment Yellow 12 (Colour Index No. 21090). | 3:3′-dichlorobenzidine and acetoacetanilide. |
| Pigment Yellow 13 (Colour Index No. 21100). | 3:3′-dichlorobenzidine and acetoacet-2,4-xylidide. |
| Pigment Yellow 14 (Colour Index No. 21095). | 3:3′-dichlorobenzidine and acetoacet-o-toluidide. |
| Pigment Yellow 17 (Colour Index No. 21105). | 3:3′-dichlorobenzidine and acetoacet-o-anisidide. |
| Pigment Yellow 81 | 2:2′:5:5′-tetrachlorobenzidine and acetoacet-2,4-xylidide. |
| | 3:3′-dichlorobenzidine and acetoacet-p-toluidide. |
| | 3:3′-dichlorobenzidine and acetoacet-o-chloranilidide. |

2. Benzidine Oranges:

| Name or colour index number | Formed by coupling |
|---|---|
| Pigment Orange 15 (Colour Index No. 21130). | 3:3′-dichlorobenzidine and 1-phenyl-3-methyl-5-pyrazolone. |
| Pigment Orange 34 (Colour Index No. 21115). | 3:3′-dichlorobenzidine and 1-p-tolyl-3-methyl-5-pyrazolone. |

3. Benzidine Reds:

| Name or colour index number | Formed by coupling |
|---|---|
| Pigment Red 37 (Colour Index No. 21205). | 3:3′-dimethoxybenzidine and 1-p-tolyl-3-methyl-5-pyrazolone. |
| Pigment Red 41 (Colour Index No. 21200). | 3:3′-dimethoxybenzidine and 1-phenyl-3-methyl-5-pyrazolone. |

4. Benzidine Blues:

| Name or colour index number | Formed by coupling |
|---|---|
| Pigment Blue 20 (Dianisidine Blue). | 3:3′-dimethoxybenzidine and anilide of 2-naphthol-3-carboxylic acid. |

5. Tolidine Yellows:

| Name or colour index number | Formed by coupling |
|---|---|
| Pigment Yellow (Colour Index No. 21155). | 3:3′-dimethylbenzidine and acetoacet-o-toluidide. |

Except where full details are given, the procedure used is essentially as follows:

A tetrazo solution is made in the usual way and kept at 0° C, and a coupling agent is dissolved in caustic soda solution.

The tetrazotised benzidine is coupled to the coupling agent by one of two procedures, usually at room temperature:

a. by reprecipitating the coupling agent with dilute acid in a coupling vessel and running in the tetrazo solution over 1 hour, again usually at room temperature. The pH of the coupling is normally 4 to 4.5 or b. the tetrazo solution and coupling agent solution are run in together into a coupling vessel containing sodium acetate buffer. The pH again is controlled as in (a). After coupling the slurry is raised to the boil and held at the boil for one hour. The slurry is then filtered, the pigment composition washed free of inorganic salts and dried at 50°–55° C.

The dyestuff can be added or made in situ at one of the four stages:

1. Before the coupling stage
2. During the coupling stage
3. After the coupling stage
4. After the boiling stage The addition of any metal salts is usually either at stages (3) or (4) to make the dyestuffs water-insoluble. The additions of either solvent or amine etc. can take place at any of the above four stages.

The following Examples illustrate the treatment of pigment/dyestuff compositions according to the invention with solvent, fatty acid or fatty ester, fatty alcohol, diol or polyol. These can be added to the reaction mixture at any of the four stages of preparation of the pigment composition at which the dyestuff can be added.

The data of Table 1 to 7 are referred to formula I.

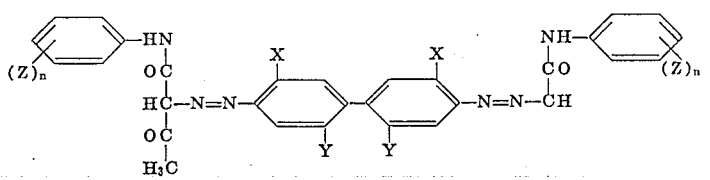

Example 1

Solution 1: Tetrazo 3:3′-dichlorobenzidine was prepared by tetrazotising 26 parts of 3:3′-dichlorobenzidine in 500 parts of water at 0° C.

Suspension 2: Tetrazo 4:4′-diamine-2:2′-biphenyl disulphonic acid was prepared by tetrazotising 2.0 parts of 4,4′-diamino-2,2′-biphenyl disulphonic acid in 50 parts of water at 0° C.

Solution 3: 40.5 parts of acetoacetanilide were dissolved in 9.9 parts of sodium hydroxide in 900 parts of water.

A solution of 20 parts of sodium acetate in 200 parts of water was prepared in a coupling vessel. The pH was then adjusted to 4.5 with dilute acetic acid.

5 percent of solution 3 was added to the coupling vessel and then suspension 2 run in over the course of 10 minutes, ensuring that at no time was any substantial quantity of uncoupled tetrazo compound present. Solutions 1 and 3 were then run into the vessel simultaneously at ambient temperature, over the course of 1 hour, again no excess of tetrazo being allowed at any time, and the pH was controlled at 4.5 as necessary by addition of 10 percent sodium hydroxide solution. The reaction mixture was then raised to the boil, and boiled for 30 minutes, the pigment composition was filtered off, washed with water and dried at 50°–55° C.

5 percent on the weight of pigment of solvent or fatty alcohol, diol or polyol was incorporated in the pigment compositions described above after the coupling stage but before boiling. The following materials were used:

dium, gave more glossy and transparent prints and greater tinctorial strength than did a pigment composition treated with solvent only (no dyestuff treatment). Rheological properties of the ink were similar to those of an ink prepared from pigment treated with solvent only.

Example 3

The procedure described in Example 2 was repeated, except that four parts of o-dichlorobenzene were used instead of four parts of dibenzyl ether. The pigment composition resulting had similar properties to the pigment obtained in Example 2.

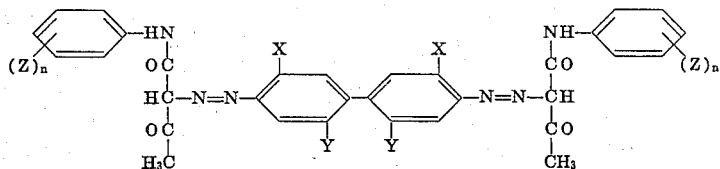

Cetyl alcohol, oleyl alcohol, iso-octanol, 2-ethylhexan 1,2 diol, polyethylene glycol 600, xylene, dibenzyl ether, dipropylene glycol monolaurate, o-dichlorobenzene, nitrobenzene, benzyl cyanide, quinoline.

The resulting compositions were tested in comparison with untreated Pigment Yellow 12, solvent treated Pigment Yellow 12, and with the compositions prepared strictly according to Examples 1, 2 and 3: in each case there was improved flow and texture over pigment merely treated with dyestuff, and superior strength and transparency to untreated pigment, or to pigment treated with solvent alone.

Example 2

(1) A tetrazo solution was made from 26.00 parts 3:3'-dichlorobenzidine in 500 parts water.

(2) A tetrazo suspension was made from 2.00 parts 4:4'-diamino-2:2'-biphenyl disulphonic acid in 120 parts water.

46.85 parts of acetoacet-meta-xylidide were dissolved in 900 parts water containing 9.15 parts of sodium hydroxide. The acetoacet-m-xylidide was then precipitated by adding a solution of 13.75 parts of glacial acetic acid in 50 parts of water, with the formation of a slurry.

Tetrazo solution 1 was then added over 1½ hours to the slurry of precipitated acetoacet-m-xylidide. The pH of the reaction mixture was maintained between 4.0 and 4.5 during the addition by the simultaneous addition of a 10 percent aqueous solution of sodium hydroxide.

The pH of the yellow pigment slurry obtained was then adjusted to pH 6.0 with 10 percent sodium hydroxide. Tetrazo suspension 2 was then added over 15 minutes to the slurry. The pH of the slurry was maintained between 5.5 and 6.0 during the addition by the simultaneous addition of a 10 percent aqueous solution of sodium hydroxide.

Four parts of dibenzyl ether were then added to the pigment slurry. The slurry was boiled for 1 hour and the pH was adjusted with 10 percent caustic soda solution to 8.0 – 9.0. The pigment was then isolated by filtering, washing the filter cake free of water-soluble impurities, and drying at 50° C.

The pigment composition obtained by this process, when incorporated into a letterpress varnish ink me- Example 4

Solution 1: Tetrazo 3:3'-dichlorobenzidine was prepared by tetrazotising 26 parts of 3:3'-dichlorobenzidine in 500 parts of water at 0° C.

Suspension 2: Tetrazo 4:4'-diamino-2:2'-biphenyl disulphonic acid was prepared by tetrazotising 2.0 parts of 4.4'-diamino-2,2'-biphenyl disulphonic acid in 50 parts of water at 0° C.

Solution 3: 46.9 parts of acetoacet-m-xylidide were dissolved in 9.9 parts of sodium hydroxide in 900 parts of water.

A solution of 20 parts of sodium acetate in 200 parts of water was prepared in a coupling vessel. The pH was then adjusted to 4.5 with dilute acetic acid.

5 percent of solution 3 was added to the coupling vessel and then suspension 2 run in over the course of 10 minutes, ensuring that at no time was any substantial quantity of uncoupled tetrazo compound present. Solutions 1 and 3 were then run into the vessel simultaneously at ambient temperature, over the course of 1 hour, again no excess of tetrazo being allowed at any time, and the pH was controlled at 4.5 as necessary by addition of 10 percent sodium hydroxide solution. The reaction mixture was then raised to the boil, and boiled for 30 minutes, the pigment composition was filtered off, washed with water and dried at 50°–55° C.

a. The procedure was followed except that an addition of 5 percent on pigment weight of cetyl alcohol was made before the pigment suspension was boiled and filtered.

b. The procedure was followed except that an addition of 5 percent on pigment weight of oleic acid was made before the pigment suspension was boiled and filtered.

In each case the product had excellent flow and texture while largely retaining the desirable high transparency. In both cases similar results could be obtained by making the addition before or during the coupling.

Example 5

The procedure described in the first part of Example 4 using 43.7 parts acetoacetorthotoluidide instead of acetoacetmetaxylidide was followed except that an addition of 5 % on pigment weight of:

a. cetyl alcohol
b. tetralin
c. polyethylene glycol 600 was made before the pigment suspension was boiled and filtered. In each case the product had superior flow properties to those of the non-treated pigment while the strength and transparency advantages of that pigment composition were largely maintained.

Similar results were obtained by making the additions before or during the coupling.

Example 6

1. A tetrazo solution was made from 27.4 parts of 3:3'-dichlorobenzidine in 500 parts water.
2. A tetrazo suspension was made from 1.5 parts 4:4'-diamino-2:2'-biphenyl disulphonic acid in 100 parts water.

49 parts of acetoacet-o-anisidide were dissolved in 9.2 parts of sodium hydroxide/900 parts of water. The coupling agent was then precipitated by the addition of 14 parts of glacial acetic acid in 50 parts of water, with the formation of a slurry.

Tetrazo solution 1 was then added over 1 hour to the slurry. The pH of the reaction mixture was maintained between 4.0 and 4.5 during the addition by simultaneous addition of a 10 percent aqueous solution of sodium hydroxide.

The pH of the yellow pigment slurry obtained was then adjusted to pH 6.0 – 7.0 with 10 percent sodium hydroxide solution. Tetrazo suspension 2 was then added over 15 minutes to the slurry. The pH of the slurry was maintained between 6.0 – 7.0 during the addition by the simultaneous addition of a 10 percent aqueous solution of sodium hydroxide.

A suspension of four parts of cetyl alcohol in 25 parts water was added and the slurry was boiled for 1 hour. The slurry was then filtered, washed salt-free and dried at 50° – 55° C.

The resulting pigment composition when incorporated into a letterpress printing ink varnish medium gave improved rheological properties over a pigment composition obtained by simply coupling acetoacet-o-anisidide with tetrazo 3:3'-dichlorobenzidine. No significant loss of tinctorial strength was found over untreated pigment.

Example 7

The procedure described in Example 6 was followed except that 5 percent on pigment weight of
 a. tetralin
 b. oleic acid
was added before the pigment suspension was boiled and filtered off. The resulting pigments exhibited excellent flow and transparency.

Similar results are obtained when the additions are made at an earlier stage of preparation.

Example 8

Solution 1 — Tetrazo 3,3'-dichlorobenzidine was prepared by tetrazotising 77.10 parts 3,3'-dichlorobenzidine in 1,500 parts water at 0° C.

Suspension 2 — Tetrazo 4,4'-diamino-2,2'-biphenyl disulphonic acid was prepared by tetrazotising 5.35 parts 4,4-diamino-2,2'-biphenyl disulphonic acid in water at 0° C.

Solution 3 — 126 parts 1-p-tolyl-3-methyl-5-pyrazolone were dissolved in 37.8 parts sodium hydroxide in 900 parts water.

A solution of 7.2 parts sodium acetate in 2,000 parts water was then prepared in a coupling vessel. The pH was adjusted to 5.0 with dilute hydrochloric acid and solutions 1 and 3 run in simultaneously at ambient temperature over the course of 30 minutes ensuring that at no time was any substantial quantity of uncoupled tetrazo present. Suspension 2 was then added over 10 minutes to the reaction mixture from solutions 1 and 3.

Five parts of cetyl alcohol suspended in 50 parts of water was then added to the reaction mixture. The resultant reaction mixture was heated to 90° C and held at 90° C for 30 minutes. The pigment was filtered off, washed with water and dried at 50°–55° C. When incorporated into a letterpress varnish, the pigment thus prepared had a colouring strength up to 15 percent greater than the pigment prepared simply by coupling 3,3'-dichlorobenzidine and 1-p-tolyl-3-methyl-5-pyrazolone. The rheological properties of the letterpress ink are much better than those of a similar ink prepared with an untreated pigment.

Example 9

The procedure described in Example 8 was repeated except that 5 percent on pigment weight of tetralin replaced the cetyl alcohol there used.

The properties of the pigment resulting from this treatment were similar to those of the pigment obtained from Example 8.

Examples 10–53 illustrate the treatment of pigment compositions according to the invention with amine or amine oxide. The amine or amine oxide can be added to the reaction mixture at any of the four stages of preparation of the pigment composition at which the dyestuff can be added. The Examples are split into two groups, Nos. 10–29 and Nos. 30–53; the first group shows the addition of more than 10 percent of amine or amine oxide for gravure ink applications; the second group shows the addition of less than 10 percent of amine or amine oxide for letterpress and lithographic ink applications.

Example 10

Solution 1: 67 parts of acetoacetanilide were dissolved in a solution of 28.2 parts of sodium hydroxide in 900 parts of water.

Solution 2: 43.5 parts of 3:3'-dichlorobenzidine were tetrazotised with 24.1 parts of sodium nitrite in 800 parts of water at 0° C.

Suspension 3: 4.1 parts of 5:5'-dimethyl-4:4'-diamino-2:2'-biphenyl disulphonic acid were tetrazotised with 1.7 parts of sodium nitrite in 125 parts of water at 0° C.

10 percent of solution 1 was run into a coupling vessel and suspension 3 was then added over the course of 10 minutes, ensuring that at no time was any substantial quantity of uncoupled tetrazo compound present.

The remainder of solution 1 and solution 2 were then added simultaneously to the reaction mixture over the course of 1 hour. The reaction temperature was maintained at or about ambient temperature, and the pH between 4.5 and 4.8, again no substantial quantity of uncoupled tetrazo compound being present at any time.

28.2 parts of the amine mixture sold under the trademark Armeen T (believed to consist essentially of palmityl, stearyl and oleyl amines) were dissolved in 17.0 parts of glacial acetic acid in 1,000 parts of water and added to the coupling vessel. The reaction mixture was then raised to the boil, and boiled for 30 minutes; the pH of the reaction mixture slurry after this boiling was adjusted to 10.0 with sodium hydroxide solution at 70° C. The pigment composition was then filtered off, washed with water and dried at 50°–55° C.

The pigment composition obtained in this way was readily dispersible in publication rotogravure ink media, giving a storage-stable ink, and was tinctorially stronger and more transparent, resulting also in a glossier product, than the benzidine yellow pigment composition obtained simply by coupling 3:3'-dichlorobenzidine and acetoacetanilide in the presence of Armeen T. A pigment composition produced without using Armeen T or similar amine or combination of amine is not readily dispersible in rotogravure ink media.

Example 11

Solutions 1 and 2 and suspension 3 were prepared as in Example 10 and a solution of Armeen T as in Example 10 was also prepared. All of solution 1 was added to the coupling vessel and the pH was adjusted to below 7.0 with dilute acid and then solution 2 and suspension 3 were mixed and added to the vessel followed by the Armeen T. The reaction mixture was then worked up as in Example 10 and the pigment obtained was similar to that obtained in Example 10, having the same desirable properties when dispersed in printing ink media, resulting in an ink stable to storage.

Example 12

The same solutions and reaction conditions were used as in Example 10, but the procedure was somewhat altered in that solution 2 was coupled first with solution 1 and then suspension 3 added to the reaction mixture. The pigment compositions obtained were similar to that obtained in Example 10, and gave storage stable gravure inks.

Examples 13–15

The procedures outlined in Examples 10–12 were repeated, replacing the Armeen T by an equal weight of Duomeen T. The pigment compositions obtained had similar excellent properties to the compositions of Examples 10–12 and gravure inks prepared from them were storage-stable.

Examples 16–18

The procedures described in Examples 10–12 were repeated, using however the equivalent quantity of 4:4'-diamino-2:2'-biphenyl disulphonic acid in place of 4:4'-diamino-5:5'dimethyl-2:2'biphenyl disulphonic acid. The pigment compositions obtained were stronger and more transparent than the pigment obtained simply by coupling 3:3'-dichlorobenzidine and acetoacetanilide, with similar advantages to the products obtained in Examples 10–12 and publication roto gravure inks prepared from them were storage stable.

Examples 19–21

The procedure described in Examples 16–18 were repeated, replacing the Armeen T by an equal weight of Duomeen T. The pigment compositions obtained had similar excellent properties to the pigment compositions obtained in Examples 16–18, and in addition publication rotogravure inks prepared from them were storage stable.

Examples 22–24

Pigment Yellow 12, Colour Index No. 21090, was treated with 5 percent on pigment weight of the dyestuff of the formula I previously defined and specific substituents as in the following Table 1, and 5 percent of amine on the pigment weight:

TABLE 1

| Example | X | Y | Z | n | Amines used— |
|---|---|---|---|---|---|
| 22 | H | SO₃Na | H | 1 | Armeen L15. Duomeen L15. |
| 23 | Cl | H | 4-SO₃Na | 1 | Armeen T. Duomeen T. |
| 24 | H | SO₃Na | 4-SO₃Na | 1 | |

In each case excellent pigment compositions were obtained which were storage stable in gravure inks.

Examples 25–27

The procedures described in Examples 10–12 were repeated, using however 72.5 parts of acetoacet-o-toluidide in place of the 67 parts of acetoacetanilide. The pigment compositions obtained were superior to that obtained simply by coupling 3:3'-dichlorobenzidine and acetoacet-o-toluidide, and gravure inks prepared from them were storage stable, and had similar good properties to the pigment compositions obtained in Examples 10–12.

Examples 28 and 29

Pigment Yellow 14, Colour Index 21095, was treated with dyestuff and amine as in the following Table 2. The dyestuff has the formula I previously defined.

TABLE 2

| Example | X | Y | Z | n | Amines used— |
|---|---|---|---|---|---|
| 28 | H | SO₃Na | H | 1 | Armeen T. Duomeen T. |
| 29 | H | SO₃Na | 4-SO₃Na | 1 | |

In each case excellent pigment compositions were obtained which were storage-stable in gravure inks.

Examples 30–34

Pigment Yellow 12, Colour Index 21090, was treated with a variety of dyestuffs and a number of amines or amine oxides, the proportion of amine or amine oxide being in each case 5 percent on pigment weight with the production of a pigment composition very suitable for use in letterpress applications. The dyestuff has the formula I previously defined, specific substituents being listed in the following Table 3.

TABLE 3

| Example | X | Y | Z | n | Amines used— |
|---|---|---|---|---|---|
| 30 | H | SO₃Na | H | 1 | Armeen T (primary amine); Duomeen T (N-long chain alkyl alkylene diamine); Armeen 2HT (secondary amine); Armeen DMCD (tertiary amine); Merginamide L275 (polyamide/polyamine); Rosin Amine D (resin amine); Duomeen L15 (β-amine); Armeen T/Aromox C/12W (primary amine/amine N-oxide); Ethomeen T12 (ethoxylated amine); Casamine C (1-amine ethyl 2-alkylimidazoline) (cyclic); N-(3-aminopropyl cyclohexylamine) (cyclic). |
| 31 | Cl | H | 4-SO₃Na | 1 | |
| 32 | CH₃ | SO₃Na | 4-SO₃Na | 1 | |
| 33 | H | SO₃Na | 4-SO₃Na | 1 | |
| 34 | H | SO₃Ca½ | H | 1 | |

In each case, the compositions produced show enhanced flow properties, dispersibility and texture when incorporated into letterpress varnish media. The rheological properties of the inks can be controlled to some extent by the type of amine used; Rosin Amine D, Duomeen T and Armeen T treatments yield good flowing products and some increase in opacity. Marginamide L275, however, almost maintains the transparency of simple dyestuff treatments and gives only a slight improvement in flow properties. Best results are obtained in application properties when dyestuffs are added before the coupling stage and amine treatment is after the coupling or boiling stages.

Examples 35

1. A tetrazo solution was made from 26.00 parts 3:3'-dichlorobenzidine in 500 parts water.
2. A tetrazo suspension was made from 2.00 parts 4:4'-diamino-2:2'-biphenyl disulphonic acid in 120 parts water.

46.85 parts of acetoacet-meta-xylidide were dissolved in 900 parts water containing 9.15 parts of sodium hydroxide. The acetoacet-m-xylidide was then precipitated by adding a solution of 13.75 parts of glacial acetic acid in 50 parts of water, with the formation of a slurry.

Tetrazo solution 1 was then added over 1½ hours to the slurry of precipitated acetoacet-m-xylidide. The pH of the reaction mixture was maintained between 4.0 and 4.5 during the addition by the simultaneous addition of a 10 percent aqueous solution of sodium hydroxide.

The pH of the yellow pigment slurry obtained was then adjusted to pH 6.0 with 10 percent sodium hydroxide. Tetrazo suspension 2 was then added over 15 minutes to the slurry The pH of the slurry was maintained between 5.5 and 6.0 during the addition by the simultaneous addition of a 10 percent aqueous solutin of sodium hydroxide.

A solution of 3.5 parts Armeen T in 250 parts of water containing 2.1 g. of glacial acetic acid was then added to the pigment slurry. The slurry was boiled for 1 hour and the pH was adjusted with 10 percent caustic soda solution to 8.0–9.0. The pigment composition was then isolated by filtering, washing the filter cake free of water-soluble impurities, and drying at 50° C.

The pigment obtained in this way was compared with the pigment obtained simply by coupling the pigment benzidine and coupling agent without any sulphonated benzidine and with no subsequent amine treatment, and with the pigment obtained by coupling in the presence of the sulphonated benzidine but with no subsequent amine treatment. At 28.6 percent weight/weight in a standard letterpress printing ink medium, the pigment according to the invention gave an ink with the best rheological properties, tinctorial strength, transparency and gloss.

Examples 36–38

The procedure described in Example 34 was repeated except that the Armeen T was replaced by 3.5 parts of Duomeen T, or by 3.5 parts of Merginamide L275 or by 3.5 parts of Rosin Amine D. Similar results were obtained.

Examples 39–41

Pigment Yellow 13, Colour Index No. 21100, was treated with a variety of dyestuffs and a number of amines or amine oxides, the proportion of amine or amine oxide being in each case 5 percent of pigment weight with the production of a pigment composition very suitable for use in letterpress applications. The dyestuff has the formula I previously defined, specific substituents being listed in the following Table 4.

TABLE 4

| Example | X | Y | Z | n | Amines used— |
|---|---|---|---|---|---|
| 39 | H | $SO_3Na$ | $2,4(CH_3)_2$ | 2 | Armeen T (primary amine); Duomeen T (N-long chain alkyl alkylene diamine); Armeen 2HT (secondary amine); Armeen DMCD (tertiary amine); Merginamide L275 (polyamide/polyamine); Rosin Amine D (resin amine); Duomeen L15 (β-amine); Armeen T/Aromox C/12W (primary amine/amine N-oxide); Ethomeen T12 (ethoxylated amine); Casamine C (1-amine ethyl 2-alkylimidazoline) (cyclic); N-(3-aminopropyl cyclohexylamine) (cyclic); methylamine cyclohexylamine. |
| 40 | $CH_3$ | $SO_3Na$ | $2,4(CH_3)_2$ | 2 | |
| 41 | H | $SO_3Na$ | H | 1 | |

In each case, the compositions produced show enhanced flow properties dispersibility and texture when incorporated into letter press varnish media.

Example 42–47

Pigment Yellow 14, Colour Index No. 21095, was treated with a variety of dyestuffs and a number of amines, the proportion of amine being in each case 5 percent of pigment weight with the production of a pigment composition very suitable for use in letter press applications. The dyestuff has the formula I previously defined, specific substituents being listed in the following Table 5:

TABLE 5

| Example | X | Y | Z | n | Amines used— |
|---|---|---|---|---|---|
| 42 | Cl | H | $4-SO_3Na$ | 1 | |
| 43 | H | $SO_3Na$ | H | 1 | |
| 44 | $CH_3$ | $SO_3Na$ | H | 1 | Armeen T; Duomeen T; Rosin Amine D. |
| 45 | H | $SO_3Na$ | $2-CH_3$ | 1 | |
| 46 | $CH_3$ | $SO_3Na$ | $2-CH_3$ | 1 | |
| 47 | H | $SO_3Na$ | $4-SO_3Na$ | 1 | |

The compositions obtained show improvement in transparency gloss and tinctorial strength when incorporated in letterpress varnish media.

Examples 48–50

Pigment Orange 15, Colour Index 21130, was treated with a variety of dyestuffs and a number of amines, the proportion of dyestuff and amine being in each case 5 percent on pigment weight with the production of a pigment composition very suitable for use in letterpress applications. The dyestuff has the formula II previously defined, specific substituents being listed in the following Table 12.

TABLE 6

| Example | X | Y | Z | Amine used— |
|---|---|---|---|---|
| 48 | H | $SO_3Na$ | H | |
| 49 | H | $SO_3Na$ | $4-SO_3Na$ | Armeen T; Duomeen T; Rosin Amine D. |
| 50 | Cl | H | $4-SO_3Na$ | |

Products with outstanding tinctorial strength, transparency and gloss are obtained.

Example 51

Solution 1

Tetrazo 3,3'-dichlorobenzidine was prepared by tetrazotising 77.10 parts 3,3'-dichlorobenzidine in 1,500 parts of water at 0° C.

Suspension 2

Tetrazo 4,4'-diamino 2,2'-biphenyl disulphonic acid was prepared by tetrazotising 5.35 parts 4,4'-diamino-2,2'-biphenyl disulphonic acid in water at 0° C.

Solution 3

126 parts 1-p-tolyl-3-methyl-5-pyrazolone were dissolved in 37.8 parts sodium hydroxide in 900 parts water.

A solution of 7.2 parts sodium acetate in 2,000 parts water was prepared in a coupling vessel. The pH was adjusted to 5.0 with dilute hydrochloric acid and solutions 1 and 3 run in simultaneously at ambient temperature over the course of 30 minutes ensuring that at no time was any substantial quantity of uncoupled tetrazo present. Suspension 2 was then added over 10 minutes to the reaction mixture from solutions 1 and 3.

Five parts of Armeen T dissolved in dilute acetic acid was then added to the reaction mixture. The resultant reaction mixture was heated to 90° C and held at 90° C for 30 minutes. The pigment was then filtered off, washed with water and dried at 50°–55° C.

When incorporated into a letterpress varnish medium, the pigment thus prepared had better tinctorial strength than an untreated pigment, together with good rheological properties and adequate texture.

Examples 52 and 53

Pigment Orange, 34, Colour Index No. 21115 was treated with a variety of dyestuffs and a number of amines, the proportion of amine being in each case 5 percent on pigment weight with the production of a pigment composition very suitable for use in letterpress applications. The dyestuff has the formula II as previously defined, specific substituents being listed in the following Table 7.

TABLE 7

| Example | X | Y | Z | Amine used— |
|---|---|---|---|---|
| 52 | H | SO₃Na | H | Armeen T; Duomeen T; Rosin Amine D. |
| 53 | Cl | H | 4-SO₃Na | |

Products with outstanding tinctorial strength, transparency and gloss are obtained.

What I claim is:

1. A diarylide pigment composition comprising (a) a coupled diarylide pigment (b) a coupled water-soluble azo dyestuff and (c) 1 to 10 percent by weight of an aromatic or heterocyclic solvent.

2. A diarylide pigment composition according to claim 1 in which component (b) is a water-soluble metal salt of a sulphonated or carboxylated water-soluble azo dyestuff.

3. A diarylide pigment composition according to claim 1 in which component (a) is a coupled diarylide pigment consisting of a pigment diarylide azo component coupled with an acetoacetarylide, pyrazolone or naphthol pigment coupling compound and component (b) is a water-soluble azo dyestuff consisting of a dyestuff azo component coupled with a dyestuff coupling component.

4. A diarylide pigment composition according to claim 3 wherein the component (b) is a water-soluble azo dyestuff consisting of a diarylide dyestuff azo component coupled with an acetoacetanilide, pyrazolone or naphthol dyestuff coupling component.

5. A diarylide pigment composition according to claim 1 wherein the component (a) is a diarylide pigment having the formula

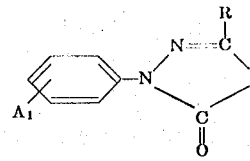
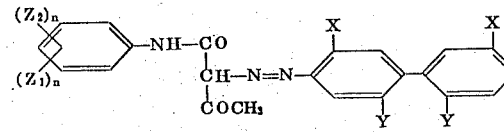

wherein X and Y are the same or different and each is H, CH₃, OCH₃ or Cl, and $Z_1$ and $Z_2$ are the same or different and each is H, CH₃, OCH₃ or Cl and n is 1 or 2.

6. A diarylide pigment composition according to claim 1 wherein component (a) is a diarylide pigment having the formula

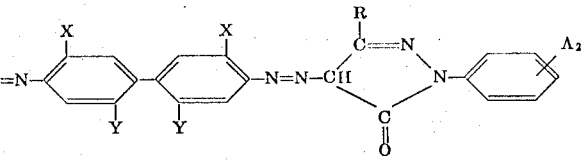

wherein X and Y are the same or different and each is H, CH₃, OCH₃ or Cl and $A_1$ and $A_2$ are the same or different and each is H, or alkyl, halogen and R is alkyl, carbalkoxy or carboxamide residues.

7. A diarylide pigment composition according to claim 1 wherein component (a) is a diarylide pigment having the formula

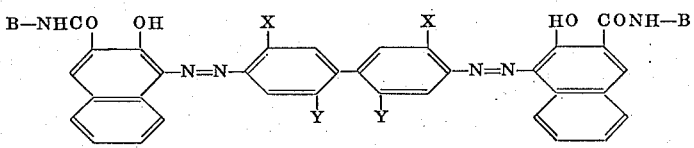

wherein X and Y are the same or different and each is H, CH₃, OCH₃ or Cl and B is the group

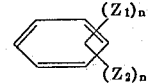

wherein $Z_1$ and $Z_2$ are the same or different and each is H, CH₃, OCH₃ and Cl or are each an α-naphthyl residue, and n is 1 or 2.

8. A diarylide pigment composition according to claim 1 wherein component (b) is a dyestuff having the formula

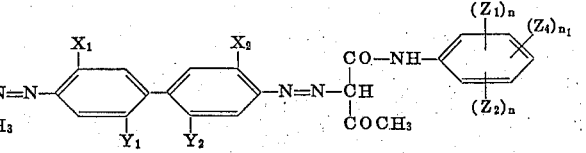

wherein $X_1$, $X_2$ and $Y_1$ and $Y_2$ are the same or different and each is H, CH₃, Cl, OCH₃ or an SO₃H or CO₂H group or their water-soluble metal salts or an amino group or water-soluble salts thereof, $Z_1$ and $Z_2$ are the same or different and each is H, CH₃, OCH₃ or Cl, $Z_3$ and $Z_4$ are the same or different and each is H or an SO₃H or CO₂H group or water-soluble salts thereof, and $n_1$ is 1 or 2 and at least one and preferably not more than four of $X_1$, $X_2$, $Y_1$, $Y_2$, $Z_3$ or $Z_4$ is an SO₃H, CO₂H or amino group or a salt thereof.

9. A diarylide pigment composition according to claim 1 wherein component (b) is a dyestuff having the formula

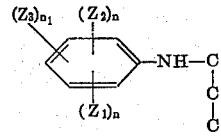
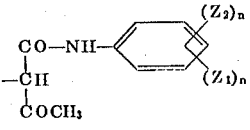

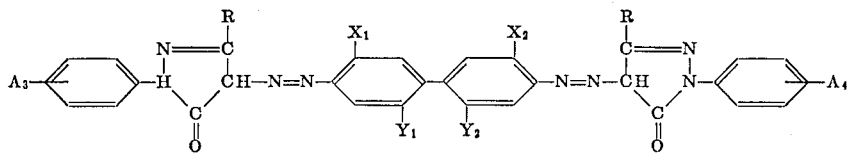

wherein $X_1$, $X_2$ and $Y_1$ and $Y_2$ are the same or different and each is H, $CH_3$, Cl, $OCH_3$ or an $SO_3H$ group or their water-soluble metal salts or an amino group or water-soluble salts thereof, R is an alkyl, carbalkoxy, carboxamide or $CO_2H$ residue or salts thereof, $A_3$ and $A_4$ are the same or different and each is H, Cl, $CH_3$, amino, $SO_3H$, $CO_2H$ or a water-soluble salt thereof and at least one and preferably not more than four of $X_1$, $X_2$, $Y_1$, $Y_2$, $A_3$, $A_4$ and R is $SO_3H$, $CO_2H$, amino or salt thereof.

10. A diarylide pigment composition according to claim 1 wherein component (b) is a dyestuff having the formula

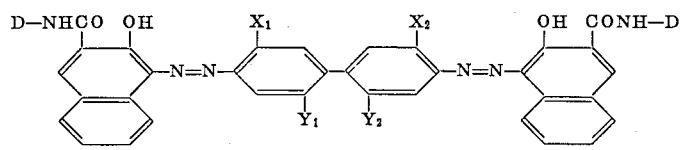

wherein $X_1$, $X_2$ and $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof, D has the formula

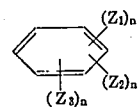

wherein $Z_1$ and $Z_2$ are the same or different and each is H, $CH_3$, $OCH_3$ or Cl and $Z_3$ is H or an $SO_3H$ or $CO_2H$ group or their water-soluble metal salts, or an amino group or water-soluble salts thereof and $n$ and $n^1$ are 1 or 2 or D has the formula

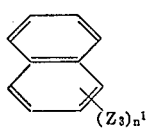

wherein $Z_3$ and $n^1$ are as defined above and at least one of $X_1$, $X_2$, $Y_1$, $Y_2$ and $Z_3$ is an $SO_3H$, $CO_2H$ or amino group or a salt thereof.

11. A diarylide pigment composition according to claim 1 wherein component (b) is a dyestuff having the formula

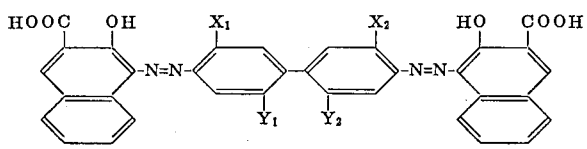

wherein $X_1$, $X_2$, $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof.

12. A diarylide pigment composition according to claim 1 wherein the component (b) is a dyestuff having the formula

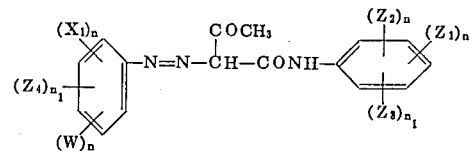

wherein W is H or $NO_2$, $n$ and $n_1$ are 1 or 2, $Z_1$ and $Z_2$ are the same or different and each is H, $CH_3$, $OCH_3$ or Cl, $Z_3$ and $Z_4$ are the same or different and each is H or an $SO_3H$ or $CO_2H$ group or their water-soluble metal salts, or an amino group or water-soluble salts thereof, and $X_1$ is H, $CH_3$, Cl, $OCH_3$, or an $SO_3H$ or $CO_2H$ group of their water-soluble metal salts or an amino group or water-soluble salts thereof.

13. A diarylide pigment composition according to claim 1 wherein component (b) is a dyestuff having the formula

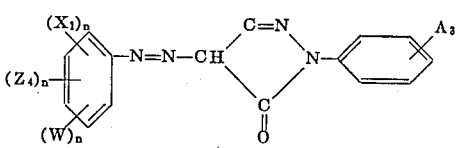

wherein $A_3$ is H, Cl, $CH_3$, amino, $SO_3H$ or $CO_2H$ or a water-soluble salt thereof, W is H or $NO_2$, $n$ is 1 or 2, $X_1$ is H, $CH_3$, Cl, $OCH_3$ or an $SO_3H$ or $CO_2H$ group or their water-soluble metal salts or an amino group or water-soluble salts thereof, and $Z_4$ is H or an $SO_3H$ or $CO_2H$ group or their water-soluble metal salts, or an amino group or water-soluble salts thereof.

14. A diarylide pigment composition according to claim 1 wherein component (b) is a dyestuff having the formula

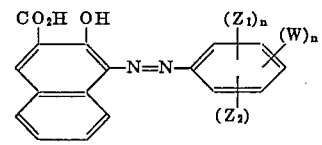

wherein $Z_1$ and $Z_2$ are the same or different and each is H, $CH_3$, $OCH_3$ or Cl, W is H or $NO_2$ and $n$ is 1 or 2.

15. A diarylide pigment composition according to claim 1 wherein component (b) is a dyestuff having the formula

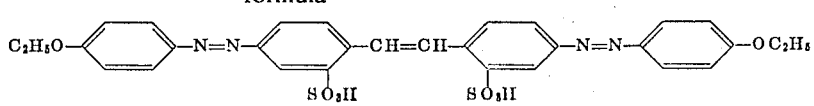

16. A diarylide pigment composition according to claim 1 wherein component (b) is a dyestuff having the formula $$M(N=NP)_n$$

wherein M is an optionally substituted aromatic residue, P is a coupling component and $n$ is 1 or 2 provided that if $n$ is 2 then the two residues need not be identical, and wherein both M and P or either M or P may contain water solubilizing groups.

17. A pigment composition according to claim 1 in which the proportion of the dyestuff component (b) is from 1 to 25 percent by weight.

18. A pigment composition according to claim 17 in which the proportion of the dyestuff component (b) is from 1 to 10 percent by weight.

19. A pigment composition according to claim 1 in which a non-ionic surface-active agent is also present.

20. A pigment composition according to claim 19 in which the non-ionic surface-active agent is an ethoxylated octyl alcohol condensate.

21. A pigment composition according to claim 1 in which a metallic salt of a resin or a free resin is also present.

22. A pigment composition according to claim 21 in which the resin is a hydrogenated resin.

23. A pigment composition according to claim 1 in which a fatty acid or ester is also present.

24. A pigment composition according to claim 23 in which the fatty acid is oleic acid or stearic acid.

25. A diarylide pigment composition comprising (a) a coupled diarylide pigment (b) a coupled water-soluble azo dyestuff and (c) 0.1 to 35 percent by weight based on the weight of pigment and dyestuff of an aliphatic amine or salt or oxide thereof each having from one to 20 carbon atoms.

26. A pigment composition according to claim 25 in which the amine is a primary amine, a resin amine, an N-longchain alkyl alkylene diamine, a polyamine, a polyamide/polyamine derivative, a β-amine, an ethoxylated fatty amine or a diamine.

27. A pigment composition according to claim 26 in which the primary amine is methylamine, stearylamine or cyclohexylamine.

28. A pigment composition according to claim 26 in which the resin amine is an amine derivative of wood resin.

29. A pigment composition according to claim 26 in which the polyamine is N-cocotrimethylene diamine-N'-propylamine.

30. A diarylide pigment composition according to claim 1 in which the solvent in component (c) is selected from the group consisting of xylene, dibenzyl ether, o-dichlorobenzene, nitrobenzene, benzyl cyanide and quinoline.

31. A diarylide pigment composition comprising (a) a coupled diarylide pigment (b) a coupled water-soluble azo dyestuff and (c) 0.1 to 30 percent by weight on dry pigment of a fatty alcohol, diol or polyol containing at least eight carbon atoms or dipropylene glycol monolaurate.

32. A diarylide pigment composition according to claim 21 in which the fatty alcohol diol or polyol in component (c) is cetyl alcohol, oleyl alcohol, behenyl alcohol, iso-octanol or 2-ethyl hexan-1:3-diol.

33. A diarylide pigment composition according to claim 31 in which component (b) is a water-soluble metal salt of a sulphonated or carboxylated water-soluble azo dyestuff.

34. A diarylide pigment composition according to claim 31 in which component (a) is a coupled diarylide pigment consisting of a pigment diarylide azo component coupled with an acetoacetarylide, pyrazolone or naphthol pigment coupling compound and component (b) is a water-soluble azo dyestuff consisting of a dyestuff azo component coupled with a dyestuff coupling component.

35. A diarylide pigment composition according to claim 25 in which component (b) is a water-soluble metal salt of a sulphonated or carboxylated water-soluble azo dyestuff.

36. A diarylide pigment composition according to claim 25 in which component (a) is a coupled diarylide pigment consisting of a pigment diarylide azo component coupled with an acetoacetarylide, pyrazolone or naphthol pigment coupling compound and component (b) is a water-soluble azo dyestuff consisting of a dyestuff azo component coupled with a dyestuff coupling component.

37. A diarylide pigment composition according to claim 31 wherein the component (a) is a diarylide pigment having the formula

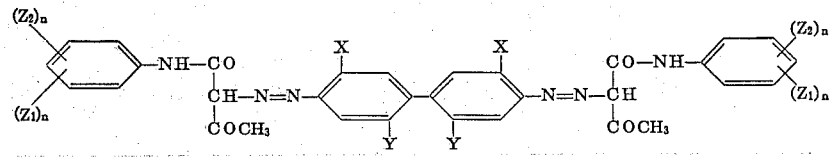

wherein $X$ and $Y$ are the same or different and each is H, $CH_3$, $OCH_3$ or Cl, and $Z_1$ and $Z_2$ are the same or different and each is H, $CH_3$, $OCH_3$ or Cl and $n$ is 1 or 2.

38. A diarylide pigment composition according to claim 31 wherein component (a) is a diarylide pigment having the formula

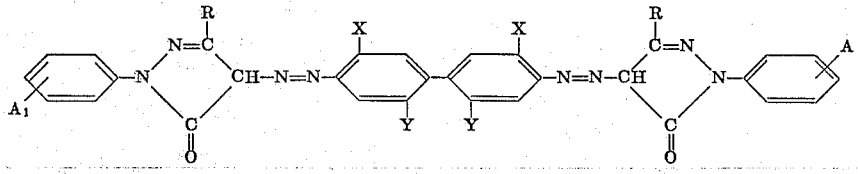

wherein $X$ and $Y$ are the same or different and each is H, $CH_3$, $OCH_3$ or Cl and $A_1$ and $A_2$ are the same or different and each is H, or alkyl, halogen and $R$ is alkyl, carbalkoxy or carboxamide residues.

39. A diarylide pigment composition according to claim 31 wherein component (a) is a diarylide pigment having the formula

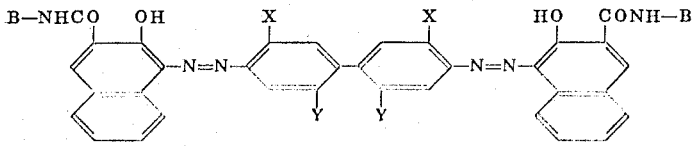

wherein X and Y are the same or different and each is H, CH₃, OCH₃ or Cl and B is the group

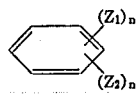

wherein $Z_1$ and $Z_2$ are the same or different and each is H, $CH_3$, $OCH_3$ and Cl or are each an α-naphthyl residue, and n is 1 or 2.

40. A diarylide pigment composition according to claim 31 wherein component (b) is a dyestuff having the formula

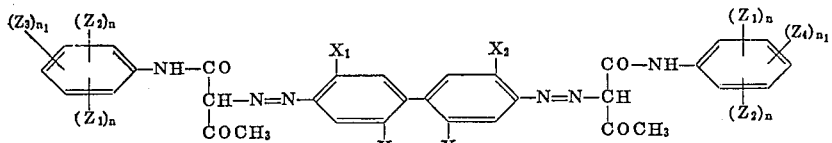

wherein $X_1$, $X_2$ and $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof, $Z_1$ and $Z_2$ are the same or different and each is H, $CH_3$, $OCH_3$ or Cl, $Z_3$ and $Z_4$ are the same or different and each is H or an $SO_3H$ or $CO_2H$ group or water-soluble salts thereof, and $n_1$ is 1 or 2 and at least one and preferably not more than four of $X_1$, $X_2$, $Y_1$, $Y_2$, $Z_3$ or $Z_4$ is an $SO_3H$, $CO_2H$ or amino group or a salt thereof.

41. A diarylide pigment composition according to claim 31 wherein component (b) is a dyestuff having the formula

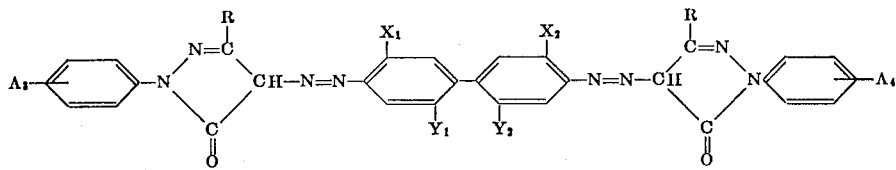

wherein $X_1$, $X_2$ and $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof, R is an alkyl, carbalkoxy, carboxamide or $CO_2H$ residue or salts thereof, $A_3$ and $A_4$ are the same or different and each is H, Cl, $CH_3$, amino, $SO_3H$, $CO_2H$ or a water-soluble salt thereof and at least one and preferably not more than four of $X_1$, $X_2$, $Y_1$, $Y_2$, $A_3$, $A_4$ and R is $SO_3H$, $CO_2H$, amino or salt thereof.

42. A diarylide pigment composition according to claim 31 wherein component (b) is a dyestuff having the formula

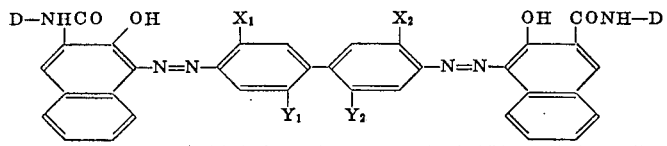

wherein $X_1$, $X_2$ and $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof, D has the formula

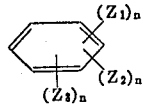

wherein $Z_1$ and $Z_2$ are the same or different and each is H, $CH_3$, $OCH_3$ or Cl and $Z_3$ is H or an $SO_3H$ or $CO_2H$ group or their water-soluble metal salts, or an amino group or water-soluble salts thereof and n and n¹ are 1 or 2 or D has the formula

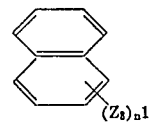

wherein $Z_3$ and n¹ are as defined above and at least one

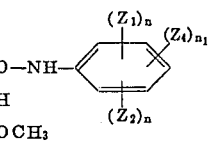

of $X_1$, $X_2$, $Y_1$, $Y_2$ and $Z_3$ is an $SO_3H$, $CO_2H$ or amino group or a salt thereof.

43. A diarylide pigment composition according to claim 31 wherein component (b) is a dyestuff having the formula

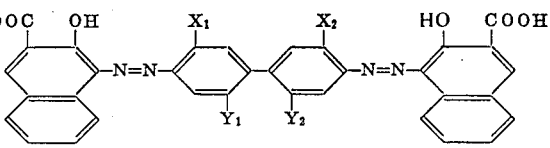

wherein $X_1$, $X_2$, $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof.

44. A diarylide pigment composition according to claim 31 wherein the component (b) is a dyestuff having the formula

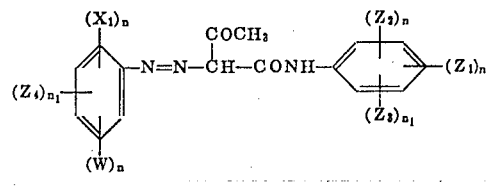

wherein W is H or $NO_2$, n and $n_1$ are 1 or 2, $Z_1$ and $Z_2$ are the same or different and each is H, $CH_3$, $OCH_3$ or Cl, $Z_3$ and $Z_4$ are the same or different and each is H or an $SO_3H$ or $CO_2H$ group or their water-soluble metal salts, or an amino group or water-soluble salts thereof, and $X_1$ is H, $CH_3$, Cl, $OCH_3$, or an $SO_3H$ or $CO_2H$ group or their water-soluble metal salts or an amino group or water-soluble salts thereof.

45. A diarylide pigment composition according to claim 31 wherein component (b) is a dyestuff having the formula

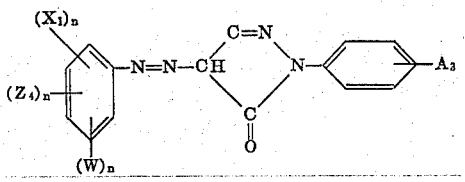

wherein $A_3$ is H, Cl, $CH_3$, amino, $SO_3H$ or $CO_2H$ or a water-soluble salt thereof, W is H or $NO_2$, n is 1 or 2, $X_1$ is H, $CH_3$, Cl, $OCH_3$ or an $SO_3H$ or $CO_2H$ group or their water-soluble metal salts or an amino group or water-soluble salts thereof, and $Z_4$ is H or an $SO_3H$ or $CO_2H$ group or their water-soluble metal salts, or an amino group or water-soluble salts thereof.

46. A diarylide pigment composition according to claim 31 wherein component (b) is a dyestuff having the formula

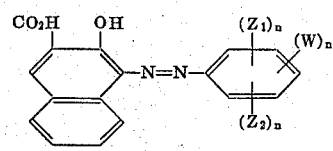

wherein $Z_1$ and $Z_2$ are the same or different and each is H, $CH_3$ $OCH_3$ or Cl, W is H or $NO_2$ and n is 1 or 2.

47. A diarylide pigment composition according to claim 31 wherein component (b) is a dyestuff having the formula

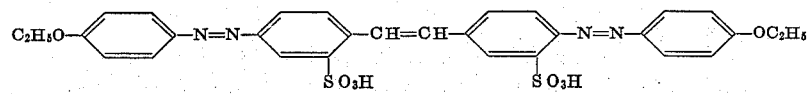

48. A diarylide pigment composition according to claim 31 wherein component (b) is a dyestuff having the formula $$M\,(N = N\,P)_n$$

wherein M is an optionally substituted aromatic residue, P is a coupling component and n is 1 or 2 provided that if n is 2 then the two residues need not be identical, and wherein both M and P or either M or P may contain water solubilizing groups.

49. A diarylide pigment composition according to claim 25 wherein the component (a) is a diarylide pigment having the formula

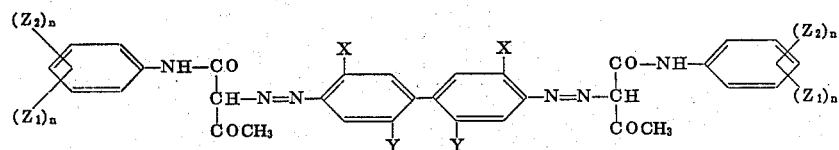

wherein X and Y are the same or different and each is H, $CH_3$, $OCH_3$ or Cl, and $Z_1$ and $Z_2$ are the same or different and each is H, $CH_3$, $OCH_3$ or Cl and n is 1 or 2.

50. A diarylide pigment composition according to claim 25 wherein component (a) is a diarylide pigment having the formula

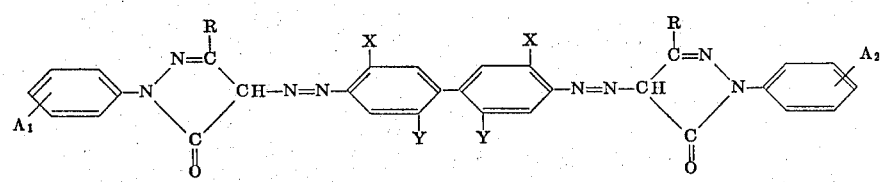

wherein X and Y are the same or different and each is H, $CH_3$, $OCH_3$ or Cl and $A_1$ and $A_2$ are the same or different and each is H, or alkyl, halogen and R is alkyl, carbalkoxy or carboxamide residues.

51. A diarylide pigment composition according to claim 25 wherein component (a) is a diarylide pigment having the formula

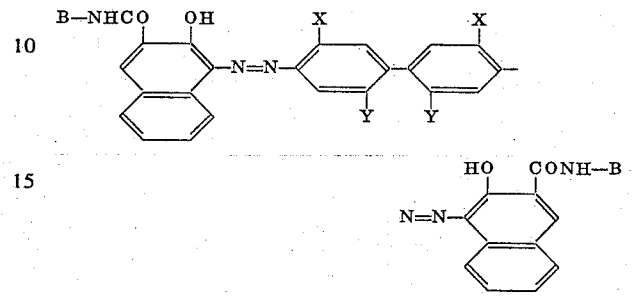

wherein X and Y are the same or different and each is H, $CH_3$, $OCH_3$ or Cl and B is the group

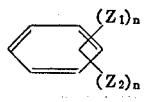

wherein $Z_1$ and $Z_2$ are the same or different and each is H, $CH_3$, $OCH_3$ and Cl or are each an α-naphthyl residue, and n is 1 or 2.

52. A diarylide pigment composition according to claim 25 wherein component (b) is a dyestuff having the formula

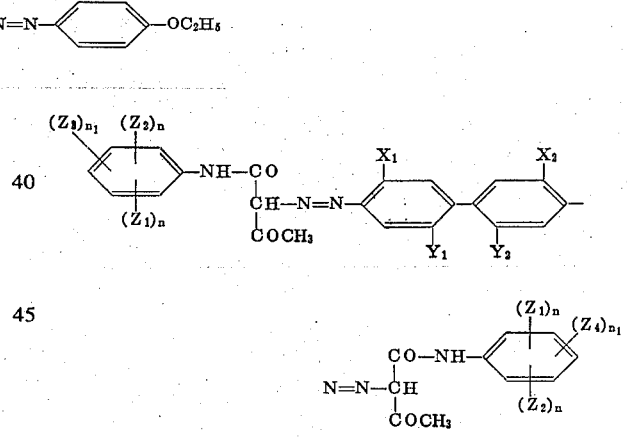

wherein $X_1$, $X_2$ and $Y_1$ and $Y_2$ are the same or different and each is H, $CH_3$, Cl, $OCH_3$ or $CO_2H$ group or their water-soluble metal salts or an amino group or water-soluble salts thereof, $Z_1$ and $Z_2$ are the same or different and each is H, $CH_3$, $OCH_3$ or Cl, $Z_3$ and $Z_4$ are the same or different and each is H or an $SO_3H$ or $CO_2H$ group or water-soluble salts thereof, and $n_1$ is 1 or 2 and at least one and preferably not more than four of $X_1$, $X_2$, $Y_1$, $Y_2$, $Z_3$ or $Z_4$ is an $SO_3H$, $CO_2H$ or amino group or a salt thereof.

53. A diarylide pigment composition according to claim 25 wherein component (b) is a dyestuff having the formula

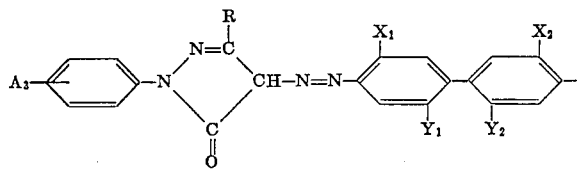

wherein $X_1$, $X_2$ and $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof, R is an alkyl, carbalkoxy, carboxamide or $CO_2H$ residue or salts thereof, $A_3$ and $A_4$ are the same or different and each is H, Cl, $CH_3$, amino, $SO_3H$, $CO_2H$ or a water-soluble salt thereof and at least one and preferably not more than four of $X_1$, $X_2$, $Y_1$, $Y_2$, $A_3$, $A_4$ and R is $SO_3H$, $CO_2H$, amino or salt thereof.

54. A diarylide pigment composition according to claim 25 wherein component (b) is a dyestuff having the formula

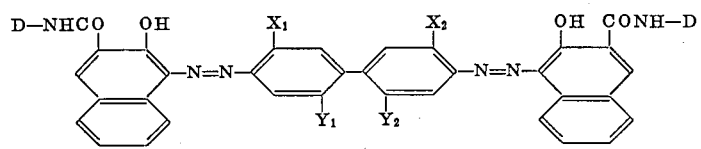

wherein $X_1$, $X_2$ and $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof, D has the formula

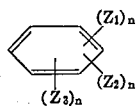

wherein $Z_1$ and $Z_2$ are the same or different and each is H, $CH_3$, $OCH_3$ or Cl and $Z_3$ is H or an $SO_3H$ or $CO_2H$ group or their water-soluble metal salts, or an amino group or water-soluble salts thereof and n and $n^1$ are 1 or 2 or D has the formula

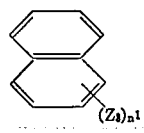

wherein $Z_3$ and $n^1$ are as defined above and at least one of $X_1$, $X_2$, $Y_1$, $Y_2$ and $Z_3$ is an $SO_3H$, $CO_2H$ or amino group or a salt thereof.

55. A diarylide pigment composition according to claim 25 wherein component (b) is a dyestuff having the formula

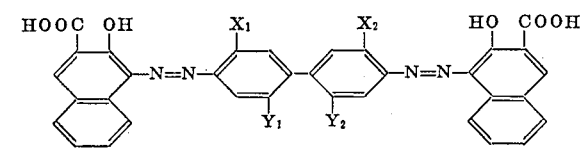

wherein $X_1$, $X_2$, $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof.

56. A diarylide pigment composition according to claim 25 wherein the component (b) is a dyestuff having the formula

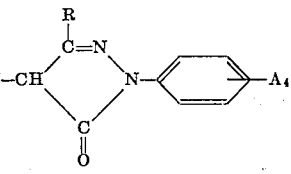

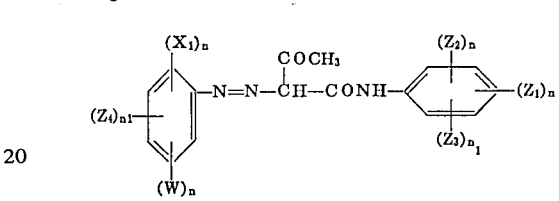

wherein W is H or $NO_2$, n and $n_1$ are 1 or 2, $Z_1$ and $Z_2$ are the same or different and each is H, $CH_3$, $OCH_3$ or Cl, $Z_3$ and $Z_4$ aare the same or different and each is H or an $SO_3H$ or $CO_2H$ group or their water-soluble metal salts, or an amino group or water-soluble salts thereof, and $X_1$ is H, $CH_3$, Cl, $OCH_3$, or an $SO_3H$ or $CO_2H$ group or their water-woluble metal salts or an amino group or water-soluble salts thereof.

57. A diarylide pigment composition according to claim 25 wherein component (b) is a dyestuff having the formula

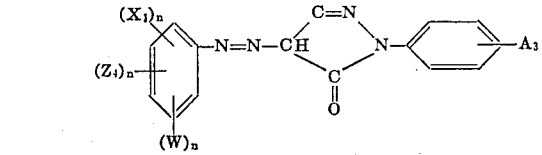

wherein $A_3$ is H, Cl, $CH_3$, amino, $SO_3H$ or $CO_2H$ or a water-soluble salt thereof, W is H or $NO_2$, n is 1 or 2, $X_1$ is H, $CH_3$, Cl, $OCH_3$ or an $SO_3H$ or $CO_2H$ group or their water-soluble metal salts or an amino group or water-soluble salts thereof, and $Z_4$ is H or an $SO_3H$ or $CO_2H$ group or their water-soluble metal salts, or an amino group or water-soluble salts thereof.

58. A diarylide pigment composition according to claim 25 wherein component (b) is a dyestuff having the formula

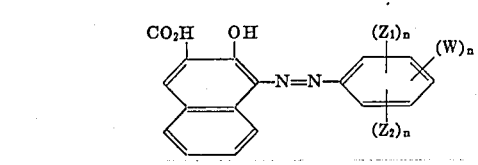

wherein $Z_1$ and $Z_2$ are the same or different and each is H, $CH_3$, $OCH_3$ or Cl, W is H or $NO_2$ and n is 1 or 2.

59. A diarylide pigment composition according to claim 25 wherein component (b) is a dyestuff having the formula

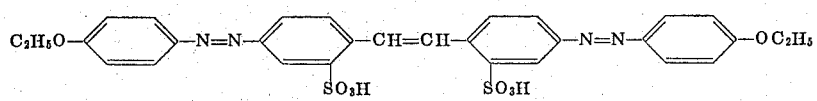

60. A diarylide pigment composition according to claim 25 wherein component (b) is a dyestuff having the formula $$M(N=NP)_n$$

wherein M is an optionally substituted aromatic residue, P is a coupling component and n is 1 or 2 provided that if n is 2 then the two residues need not be identical, and wherein both M and P or either M or P may contain water solubilizing groups.

61. A pigment composition according to claim 31 in which the proportion of the dyestuff component (b) is from 1 to 25 percent by weight.

62. A pigment composition according to claim 25 in which the proportion of the dyestuff component (b) is from 1 to 25 percent by weight.

63. A pigment composition according to claim 31 in which a non-ionic surface-active agent is also present.

64. A pigment composition according to claim 63 in which the non-ionic surface-active agent is an ethoxylated octyl alcohol condensate.

65. A pigment composition according to claim 31 in which a metallic salt of a resin or a free resin is also present.

66. A pigment composition according to claim 65 in which the resin is a hydrogenated resin.

67. A pigment composition according to claim 31 in which a fatty acid or ester is also present.

68. A pigment composition according to claim 67 in which the fatty acid is oleic acid or stearic acid.

69. A pigment composition according to claim 25 in which a non-ionic surface-active agent is also present.

70. A pigment composition according to claim 69 in which the non-ionic surface-active agent is an ethoxylated octyl alcohol condensate.

71. A pigment composition according to claim 25 in which a metallic salt of a resin or a free resin is also present.

72. A pigment composition according to claim 71 in which the resin is a hydrogenated resin.

73. A pigment composition according to claim 25 in which a fatty acid or ester is also present.

74. A pigment composition according to claim 73 in which the fatty acid is oleic acid or stearic acid.

75. A process of producing a pigment composition comprising the steps of a. coupling one or more appropriate tetra-azotized benzidine compounds and one or more appropriate pigment coupling agents to produce a pigment having one of formulae (I), (II) and (III) as defined below:

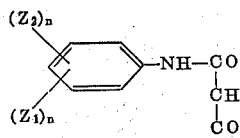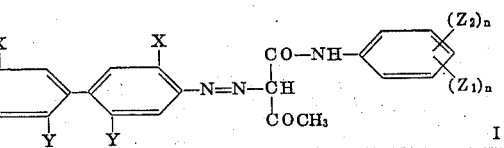

I wherein X and Y are the same or different and each is H, $CH_3$, $OCH_3$ or Cl, and $Z_1$ and $Z_2$ are the same or different and each is H, $CH_3$, $OCH_3$ or Cl and n is 1 or 2,

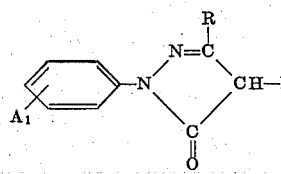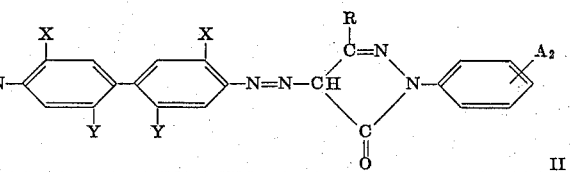

II wherein X and Y have the meanings above and $A_1$ and $A_2$ are the same or different and each is H, or alkyl, halogen and R is alkyl, carbalkoxy or carboxamide residues, and

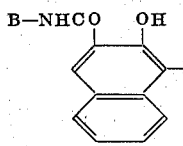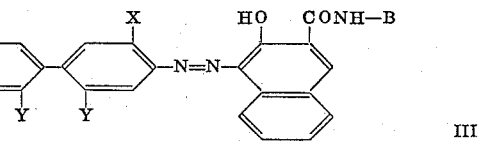

III wherein X and Y have the meanings above and B is the group

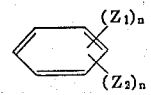

wherein $Z_1$ and $Z_2$ are the same or different and each is H, $CH_3$, $OCH_3$ and Cl or are each an α-naphthyl residue, and n is 1 or 2;

b. coupling one or more appropriate diazotized or tetrazotized compounds and one or more appropriate dyestuff coupling agents to produce a dyestuff having one of the formulae IA, IIA, IIIA, IVA, VA, VIA, VIIA, VIIIA and IXA as defined below:

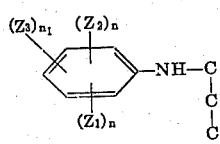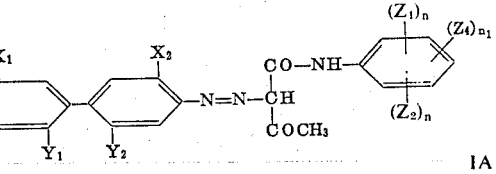

IA wherein $X_1$, $X_2$ and $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof, $Z_1$ and $Z_2$ are the same or different and each is H, $CH_3$, $OCH_3$ or Cl, $Z_3$ and $Z_4$ are the same or different and each is H or an $SO_3H$ or $CO_2H$ group or their water-soluble metal salts, or an amino group or water-soluble salts thereof, and $n_1$ is 1 or 2 and at least one and preferably not more than four of $X_1$, $X_2$, $Y_1$, $Y_2$, $Z_3$ or $Z_4$ is an $SO_3H$, $CO_2H$ or amino group or a salt thereof,

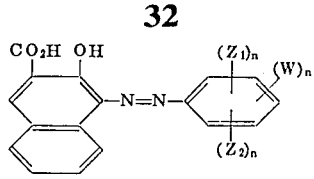

VIIA

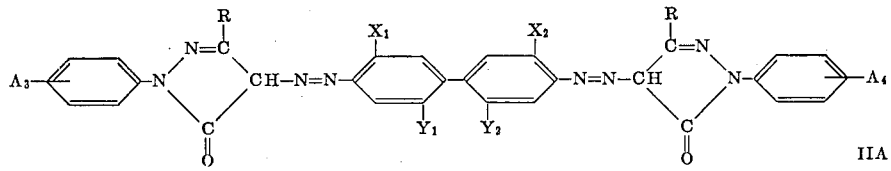

IIA wherein $X_1$, $X_2$ and $Y_1$ and $Y_2$ are as defined above, $R$ wherein $Z_1$, $Z_2$, $W$ and $n$ are as defined above,

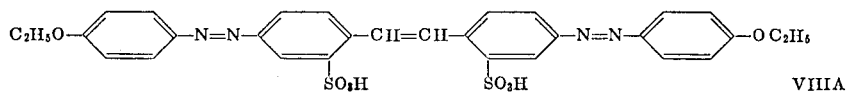

VIIIA and $$M(N=NP)_n \quad \text{IXA}$$

is an alkyl, carbalkoxy, carboxamide, or $CO_2H$ residue or salts thereof, $A_3$ and $A_4$ are the same or different and each is H, Cl, $CH_3$, amino, $SO_3H$, $CO_2H$ or a water-soluble salt thereof and at least one and preferably not more than four of $X_1$, $X_2$, $Y_1$, $Y_2$, $A_3$, $A_4$ and $R$ is $SO_3H$, $CO_2H$, amino or salt thereof, wherein $M$ is an optionally substituted aromatic residue, $P$ is a copuling component and $n$ is 1 or 2 provided

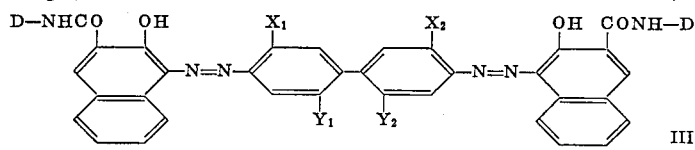

IIIA wherein $X_1$, $X_2$, $Y_1$ and $Y_2$ are as defined above, $D$ has the formula

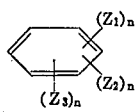

wherein $Z_1$, $Z_2$ and $Z_3$ and $n$ and $n^1$ have meanings stated above or $D$ has the formula

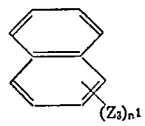

wherein $Z_3$ and $n^1$ are as defined above and at least one of $X_1$, $X_2$, $Y_1$, $Y_2$, and $Z_3$ is an $SO_3H$, $CO_2H$ or amino group or a salt thereof, that if $n$ is 2 then the two residues need not be identical, and wherein both $M$ and $P$ or either $M$ or $P$ contain water solubilizing groups, (c) incorporating the dyestuff from step (b) into the pigment from step (a), and (d) incorporating into the pigment or dyestuff or pigment/dyestuff mixture from 1 to 10 percent by weight of a solvent selected from the group consisting of xylene, dibenzyl ether, o-dichlorobenzene, nitrobenzene, benzyl cyanide and quinoline.

76. A process according to claim 75 in which one or more fatty alcohols, diols or polyols are added to a preformed azo pigment.

77. A process of producing a pigment composition comprising the steps of

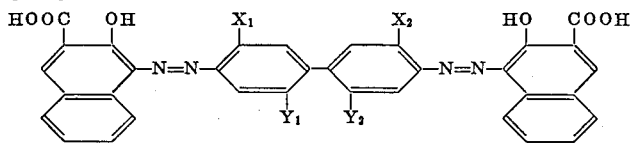

IVA wherein $X_1$, $X_2$, $Y_1$ and $Y_2$ are as defined above or a salt thereof,

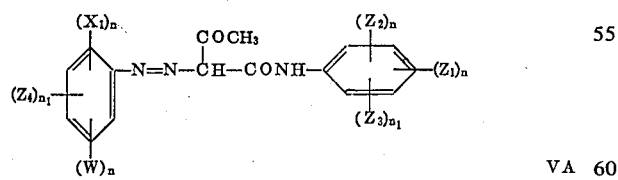

a. coupling one or more appropriate tetra-azotized benzidine compounds and one or more appropriate pigment coupling agents to produce a pigment having one of formulae (I), (II) and III) as defined below:

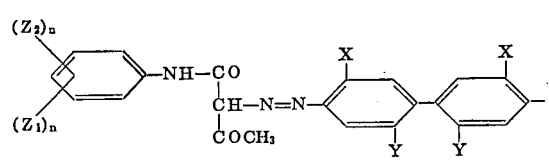

VA wherein $W$ is H or $NO_2$ and $X_1$, $Z_1$ and $Z_4$ are as defined above,

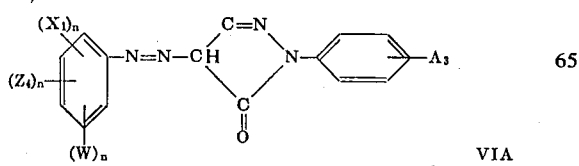

VIA wherein $A_3$, $W$, $X_1$ and $Z_4$ and $n$ are as defined above,

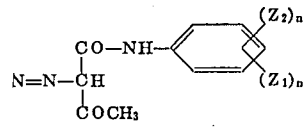

I wherein X and Y are the same or different and each is H, $CH_3$, $OCH_3$ or Cl, and $Z_1$ and $Z_2$ are the same or different and each is H, $CH_3$, $OCH_3$ or Cl and $n$ is 1 or 2,

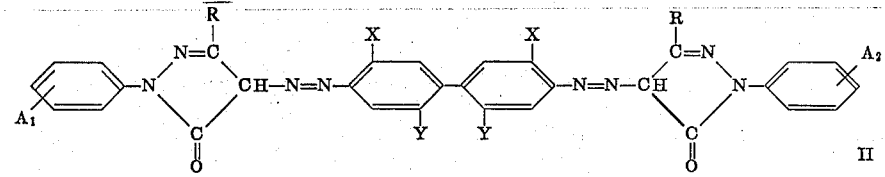

wherein X and Y have the meanings above and $A_1$ and $A_2$ are the same or different and each is H, or alkyl, halogen and R is alkyl, carbalkoxy or carboxamide residues, and

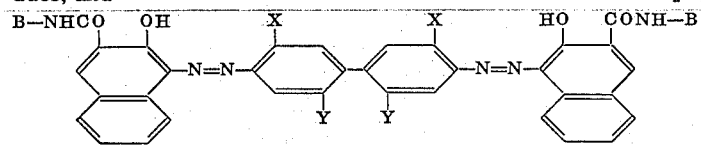

wherein X and Y have the meanings above and B is the group

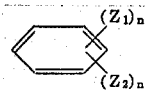

wherein $Z_1$ and $Z_2$ are the same or different and each is H, $CH_3$, $OCH_3$ and Cl or are each an α-naphthyl residue, and $n$ is 1 or 2;

b. coupling one or more appropriate diazotized or tetrazotized compounds and one or more appropriate dyestuff coupling agents to produce a dyestuff having one of the formulae IA, IIA, IIIA, IVA, VA, VIA, VIIA, VIIIA and IXA as defined below:

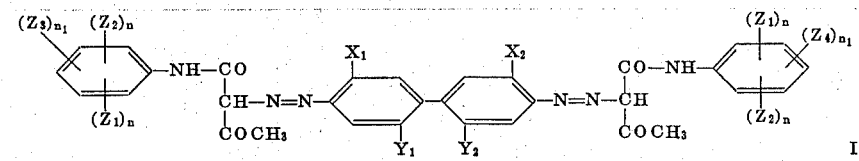

wherein $X_1$, $X_2$ and $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof, $Z_1$ and $Z_2$ are the same or different and each is H, $CH_3$, $OCH_3$ or Cl, $Z_3$ and $Z_4$ are the same or different and each is H or an $SO_3H$ or $CO_2H$ group or their water-soluble metal salts, or an amino group or water-soluble salts thereof, and $n_1$ is 1 or 2 and at least one and preferably not more than four of $X_1$, $X_2$, $Y_1$, $Y_2$, $Z_3$ or $Z_4$ is an $SO_3H$, $CO_2H$ or amino group or a salt thereof, wherein $X_1$, $X_2$ and $Y_1$ and $Y_2$ are as defined above, R is an alkyl, carbalkoxy, carboxamide, or $CO_2H$ residue or salts thereof, $A_3$ and $A_4$ are the same or different and

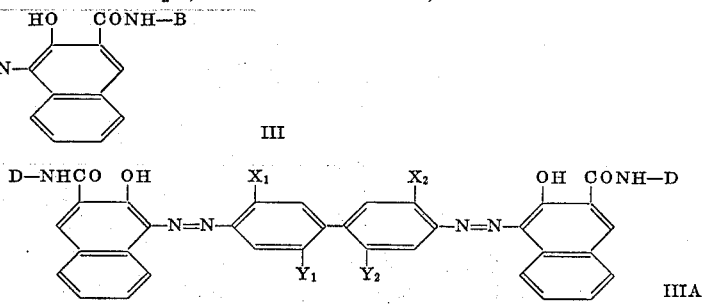

each is H, Cl, $CH_3$, amino, $SO_3H$, $CO_2H$ or a water-soluble salt thereof and at least one and preferably not more than four of $X_1$, $X_2$, $Y_1$, $Y_2$, $A_3$, $A_4$ and R is $SO_3H$, $CO_2H$, amino or salt thereof,

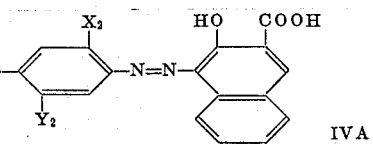

wherein $X_1$, $X_2$, $Y_1$ and $Y_2$ are as defined above, D has the formula

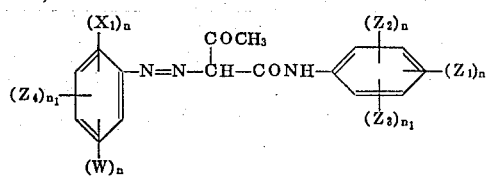

wherein $Z_1$, $Z_2$ and $Z_3$ and $n$ and $n^1$ have meanings stated above or D has the formula wherein $Z_3$ and $n^1$ are as defined above and at least one of $X_1$, $X_2$, $Y_1$, $Y_2$, and $Z_3$ is an $SO_3H$, $CO_2H$ or a salt thereof,

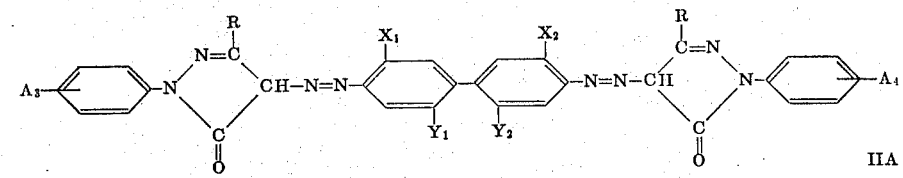

wherein $X_1$, $X_2$, $Y_1$ and $Y_2$ are as defined above or a salt thereof, wherein $W$ is H or $NO_2$ and $X_1$, $Z_1$ and $Z_4$ are as defined above,

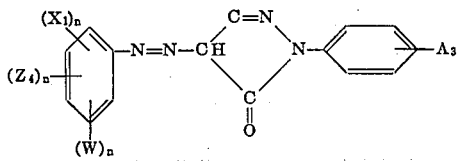

VIA wherein $A_3$, $W$, $X_1$ and $Z_4$ and $n$ are as defined above,

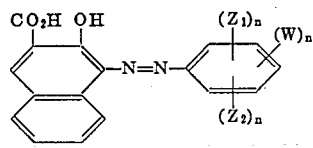

VIIA wherein $Z_1$, $Z_2$, $W$ and $n$ are as defined above,

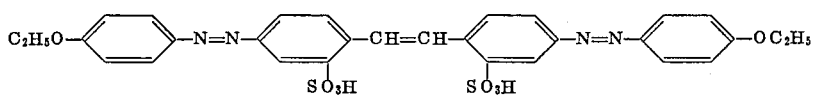

VIIIA and $$M(N=NP)_n \qquad \text{IXA}$$

wherein $M$ is an optionally substituted aromatic residue, $P$ is a copuling component and $n$ is 1 or 2 provided that if $n$ is 2 then the two residues need not be identical, and wherein both $M$ and $P$ or either $M$ or $P$ contain water solubilizing groups, c. incorporating the dyestuff from step (b) into the pigment from step (a), and d. incorporating into the pigment or dyestuff or pigment/dyestuff mixture 0.1 to 30 percent by weight on dry pigment of a fatty alcohol, diol or polyol containing at least eight carbon atoms, or dipropylene glycol monolaurate.

78. A process according to claim 77 in which the pigment and dyestuff combination is formed into an aqueous slurry, the alcohol, diol or polyol is added to the slurry with agitation and heating and the pigment composition is then filtered off, washed and dried.

79. A process of producing a pigment composition comprising the steps of a. coupling one or more appropriate tetra-azotized benzidine compounds and one or more appropriate pigment coupling agents to produce a pigment having one of formulae (I), (II) and (III) as defined below:

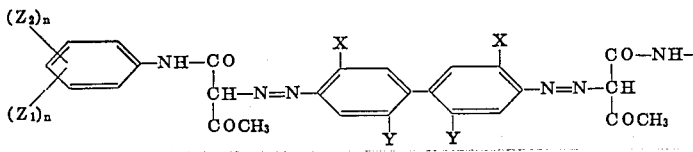

I wherein $X$ and $Y$ are the same or different and each is H, $CH_3$, $OCH_3$ or Cl, and $Z_1$ and $Z_2$ are the same or different and each is H, $CH_3$, $OCH_3$ or Cl and $n$ is 1 or 2,

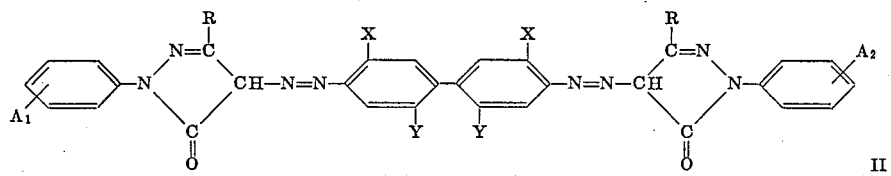

II wherein $X$ and $Y$ have the meanings above and $A_1$ and $A_2$ are the same or different and each is $H$, or alkyl, halogen and $R$ is alkyl, carbalkoxy or carboxamide residues, and

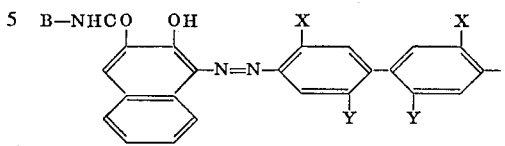

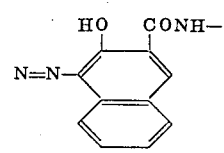

III wherein $X$ and $Y$ have the meanings above and $B$ is the group

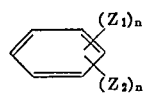

wherein $Z_1$ and $Z_2$ are the same or different and each is H, $CH_3$, $OCH_3$ and Cl or are each an $\alpha$-naphthyl residue, and $n$ is 1 or 2;

b. coupling one or more appropriate diazotized or tetrazotized compounds and one or more appropriate dyestuff coupling agents to produce a dyestuff having one of the formulae IA, IIA, IIIA, IVA, VA, VIA, VIIA, VIIIA and IXA as defined below:

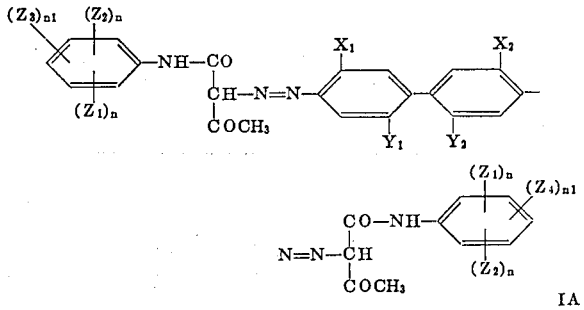

IA wherein $X_1$, $X_2$ and $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof, $Z_1$ and $Z_2$ are the same or different and each is H, $CH_3$, $OCH_3$ or Cl, $Z_3$ and $Z_4$ are the same or different and each is H or an $SO_3H$ or $CO_2H$ group or their water-soluble metal salts, or an amino group or water-soluble salts thereof, and $n_1$ is 1 or 2 and at least one and preferably not more than four of $X_1$, $X_2$, $Y_1$, $Y_2$, $Z_3$ or $Z_4$ is an $SO_3H$, $CO_2H$ or amino group or a salt thereof,

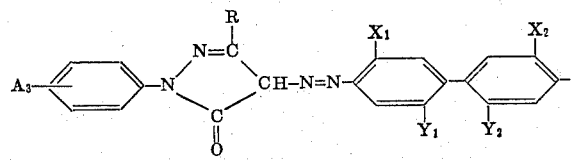

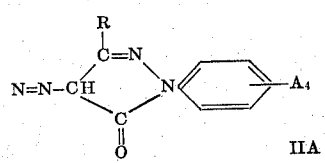

IIA wherein $X_1$, $X_2$ and $Y_1$ and $Y_2$ are as defined above, R is an alkyl, carbalkoxy, carboxamide, or $CO_2H$ residue or salts thereof, $A_3$ and $A_4$ are the same or different and each is H, Cl, $CH_3$, amino, $SO_3H$, $CO_2H$ or a water-soluble salt thereof and at least one and preferably not more than four of $X_1$, $X_2$, $Y_1$, $Y_2$, $A_3$, $A_4$ and R is $SO_3H$, $CO_2H$, amino or salt thereof,

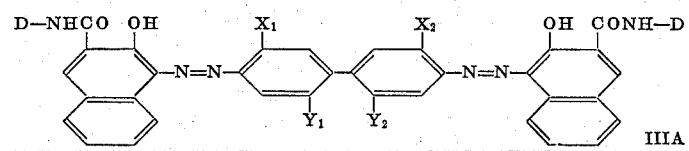

IIIA wherein $X_1$, $X_2$, $Y_1$ and $Y_2$ are as defined above, D has the formula

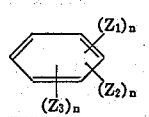

wherein $Z_1$, $Z_2$ and $Z_3$ and $n$ and $n^1$ have meanings stated above or D has the formula

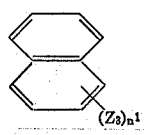

wherein $Z_3$ and $n^1$ are as defined above and at least one of $X_1$, $X_2$, $Y_1$, $Y_2$, and $Z_3$ is an $SO_3H$, $CO_2H$ or amino group or a salt thereof,

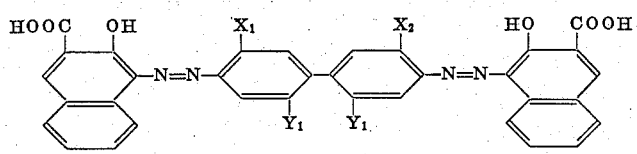

IVA wherein $X_1$, $X_2$, $Y_1$ and $Y_2$ are as defined above or a salt thereof,

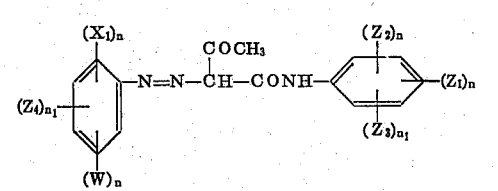

VA wherein W is H or $NO_2$ and $X_1$, $Z_1$ and $Z_4$ are as defined above,

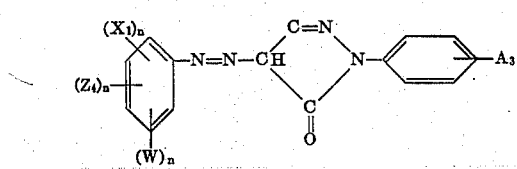

VIA wherein $A_3$, W, $X_1$ and $Z_4$ and $n$ are as defined above,

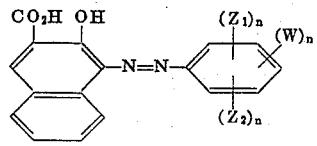

VIIA wherein $Z_1$, $Z_2$, W and $n$ are as defined above,

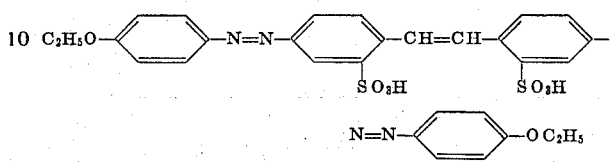

VIIIA and $$M (N=NP)_n$$

IXA wherein M is an optionally substituted aromatic residue, P is a copuling component and $n$ is 1 or 2 provided that if $n$ is 2 then the two residues need not be identical, and wherein both M and P or either M or P contain water solubilizing groups, c. incorporating the dyestuff from step (b) into the pigment from step (a), and d. incorporating into the pigment or dyestuff or pigment/dyestuff mixture 0.1 to 35 percent by weight based on the weight of pigment and dyestuff of an aliphatic amine or salt or oxide thereof, having from one to 20 carbon atoms.

80. A process according to claim 79 in which a tetrazotized pigment benzidine is coupled with a pigment coupling agent in the present of a dyestuff, an amine salt is then added after coupling, the pH is raised to alkaline and the slurry is boiled, and in which the only metallic cations present are alkali metal cations.

81. A process according to claim 79 in which a tetrazotized pigment benzidine is coupled with a pigment coupling agent in the presence of a dyestuff, the slurry is boiled, the amine salt is then added and finally the pH is raised to alkaline.

82. A process according to claim 79 in which a tetrazotized pigment benzidine is coupled with a pigment coupling agent in the presence of a dyestuff, the slurry is made alkaline, the amine salt is added to the alkaline slurry and the slurry is then boiled.

83. A process according to claim 79 in which a tetrazotized pigment benzidine is coupled with a pigment coupling agent in the presence of a dyestuff, the slurry is made alkaline and the slurry is then boiled prior to the addition of the amine salt.

84. A process according to claim 79 in which the tetrazotized pigment benzidine is coupled with a pigment coupling agent in the presence of a dyestuff, the pigment slurry is then boiled, then made alkaline and finally the amine salt is added.

85. A process according to claim 79 in which the tetrazotized pigment benzidine is coupled with a pigment coupling agent in the presence of a dyestuff, the pigment slurry is kept acidic and then the amine salt is added before or after the slurry is boiled.

86. A process according to claim 79 in which the dyestuff is incorporated into the pigment, a metal salt of the dyestuff is formed and then the amine is added.

87. A process according to claim 86 in which the dyestuff is rendered insoluble by the formation of an insoluble salt of a metal of one of the Groups IA, IB, IIA, IIB, IIIA, IIIB and VIII of the Periodic Table.

88. A process according to claim 87 in which a double decomposition reaction is effected between the sodium salt of the dyestuff and a water-soluble salt of the metal at an alkaline pH value.

89. A process according to claim 88 in which the metal salt is selected from zinc sulphate, magnesium sulphate, barium chloride, aluminum sluphate and calcium chloride.

90. A process according to claim 77 in which one or more fatty alcohols, diols or polyols are added during the preparation of the pigment component to the pigment coupling agent before the coupling.

91. A process according to claim 77 in which one or more fatty alcohols, diols or polyols are added during the preparation of the pigment component to the pigment benzidine compound before or after diazotization and before the coupling.

92. A process according to claim 77 in which one or more fatty alcohols, diols or polyols are added during the preparation of the pigment component added to the reaction mixture during coupling.

93. A process according to claim 75 in which a fatty acid or ester is present during the process.

94. A process according to claim 77 in which a farry acid or ester is present during the process.

95. A process according to claim 79 in which a fatty acid or ester is present during the process.

96. A process according to claim 93 in which the fatty acid or ester is added during or after the coupling stage or is present from the start.

97. A process according to claim 94 in which the fatty acid or ester is added during or after the coupling stage or is present from the start.

98. A process according to claim 95 in which the fatty acid or ester is added during or after the coupling stage or is present from the start.

99. A process according to claim 96 in which the fatty acid is rendered insoluble in the final pigment composition by conversion to sparingly soluble salts.

100. A process according to claim 97 in which the fatty acid is rendered insoluble in the final pigment composition by conversion to sparingly soluble salts.

101. A process according to claim 98 in which the fatty acid is rendered insoluble in the final pigment composition by conversion to sparingly soluble salts.

102. A process according to claim 79 in which one or more amines or amine oxides are added to the pigment production mixture during the coupling.

103. A process according to claim 79 in which one or more amines or amine oxides are added to the tetrazotized pigment benzidine before coupling.

104. A process according to claim 79 in which one or more amines or amine oxides are added to the preformed pigment.

105. A printing ink containing a pigment composition according to claim 1.

106. A printing ink according to claim 100 wherein the printing ink is a gravure or letter press ink.

107. A printing ink containing a pigment composition according to claim 31.

108. A printing ink according to claim 107 wherein the printing ink is a gravure or letter press ink.

109. A printing ink containing a pigment composition according to claim 25.

110. A printing ink according to claim 109 wherein the printing ink is a gravure or letter press ink.

* * * * *